(12) United States Patent
Naik et al.

(10) Patent No.: US 11,260,777 B2
(45) Date of Patent: Mar. 1, 2022

(54) RECLINER HEART FOR SEAT RECLINER ASSEMBLY

(71) Applicant: FISHER & COMPANY, INCORPORATED, St. Clair Shores, MI (US)

(72) Inventors: Firoz Divan Naik, Harrison Charter Township, MI (US); Sapan Mahendra Poptani, Northville, MI (US); Raghu Belagur Sathyanarayanasetty, Roseville, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 30 days.

(21) Appl. No.: 16/542,369

(22) Filed: Aug. 16, 2019

(65) Prior Publication Data
US 2020/0070689 A1    Mar. 5, 2020

Related U.S. Application Data

(60) Provisional application No. 62/724,068, filed on Aug. 29, 2018.

(51) Int. Cl.
*B60N 2/20* (2006.01)
*B60N 2/22* (2006.01)
*B60N 2/235* (2006.01)

(52) U.S. Cl.
CPC ............. *B60N 2/20* (2013.01); *B60N 2/2227* (2013.01); *B60N 2/235* (2013.01)

(58) Field of Classification Search
CPC ...... B60N 2/236; B60N 2/2356; B60N 2/235; B60N 2/2252; B60N 2/2227; B60N 2/2245; B60N 2/20; B60N 2002/024

(Continued)

(56) References Cited

U.S. PATENT DOCUMENTS

| 3,736,026 A | 5/1973 | Ziegler et al. |
| 3,953,069 A | 4/1976 | Tamura et al. |

(Continued)

FOREIGN PATENT DOCUMENTS

| CA | 2869816 A1 * | 10/2013 | ............. B60N 2/235 |
| CN | 1291566 A | 4/2001 | |

(Continued)

OTHER PUBLICATIONS

Office Action regarding German Patent Application No. 102016114406.1, dated Apr. 27, 2020. Translation provided by Witte, Weller & Partner Patentanwälte mbB.

(Continued)

*Primary Examiner* — Milton Nelson, Jr.
(74) *Attorney, Agent, or Firm* — Harness, Dickey & Pierce, P.L.C.

(57) ABSTRACT

A recliner heart includes first, second and third locking plates and a pawl. The first locking plate defines a recess. The second locking plate includes a first inner diametrical surface having first teeth formed thereon. The third locking plate is disposed between the first and second locking plates and includes a second inner diametrical surface and an outer diametrical surface. The second inner diametrical surface has a notch formed therein. The outer diametrical surface has second teeth formed thereon. Some of the second teeth are meshingly engaged with some of the first teeth. The pawl is slidably disposed in the recess between a secure position in which the pawl is engaged with the notch of the third locking plate and a release position in which the pawl is disengaged from the notch of the third locking plate.

23 Claims, 26 Drawing Sheets

(58) Field of Classification Search
USPC .................................................. 297/367 P
See application file for complete search history.

(56) References Cited

U.S. PATENT DOCUMENTS

| | | | |
|---|---|---|---|
| 4,219,234 A | 8/1980 | Bell | |
| 4,243,264 A | 1/1981 | Bell | |
| 4,279,442 A | 7/1981 | Bell | |
| 4,372,610 A | 2/1983 | Fisher, III et al. | |
| 4,457,557 A | 7/1984 | Une | |
| 4,484,779 A | 11/1984 | Suzuki | |
| 4,579,387 A | 4/1986 | Bell | |
| 4,634,182 A | 1/1987 | Tanaka | |
| 4,684,174 A | 8/1987 | Bell | |
| 4,705,319 A | 11/1987 | Bell | |
| 4,720,145 A | 1/1988 | Bell | |
| 4,733,912 A | 3/1988 | Secord | |
| 4,747,641 A | 5/1988 | Bell | |
| 4,795,213 A | 1/1989 | Bell | |
| 4,822,100 A | 4/1989 | Bell | |
| 4,919,482 A | 4/1990 | Landis et al. | |
| 4,928,374 A | 5/1990 | Allen | |
| 5,007,680 A | 4/1991 | Miyauchi et al. | |
| 5,044,647 A | 9/1991 | Patterson | |
| 5,154,476 A | 10/1992 | Haider et al. | |
| 5,240,309 A | 8/1993 | Kojer | |
| 5,248,184 A | 9/1993 | Morris | |
| 5,265,937 A | 11/1993 | Allen | |
| 5,393,116 A | 2/1995 | Bolsworth et al. | |
| 5,419,616 A | 5/1995 | Paetzold | |
| 5,435,624 A | 7/1995 | Bray et al. | |
| 5,460,429 A | 10/1995 | Whalen | |
| 5,489,141 A | 2/1996 | Strausbaugh et al. | |
| 5,577,805 A | 11/1996 | Glinter et al. | |
| 5,590,932 A | 1/1997 | Olivieri | |
| 5,622,410 A | 4/1997 | Robinson | |
| 5,628,215 A | 5/1997 | Brown | |
| 5,660,440 A | 8/1997 | Pejathaya | |
| 5,718,481 A | 2/1998 | Robinson | |
| 5,769,493 A | 6/1998 | Pejathaya | |
| 5,788,330 A | 8/1998 | Ryan | |
| 5,823,622 A | 10/1998 | Fisher, IV et al. | |
| 5,857,659 A | 1/1999 | Kato et al. | |
| 5,918,939 A | 7/1999 | Magadanz | |
| 5,927,809 A | 7/1999 | Tame | |
| 5,941,591 A | 8/1999 | Tsuge et al. | |
| 5,947,560 A | 9/1999 | Chen | |
| 5,979,986 A | 11/1999 | Pejathaya | |
| 6,007,152 A | 12/1999 | Kojima et al. | |
| 6,023,994 A | 2/2000 | Yoshida | |
| 6,047,444 A | 4/2000 | Braun | |
| 6,068,341 A | 5/2000 | Rink | |
| 6,074,009 A | 6/2000 | Farino | |
| 6,095,609 A | 8/2000 | Magadanz | |
| 6,106,067 A | 8/2000 | Zhuang et al. | |
| 6,123,380 A | 9/2000 | Sturt et al. | |
| 6,139,104 A | 10/2000 | Brewer | |
| 6,158,800 A | 12/2000 | Tsuge et al. | |
| 6,161,899 A | 12/2000 | Yu | |
| 6,199,953 B1 | 3/2001 | Chen | |
| 6,250,704 B1 | 6/2001 | Garrido | |
| 6,290,297 B1 | 9/2001 | Yu | |
| 6,328,381 B1 | 12/2001 | Smuk | |
| 6,345,867 B1 | 2/2002 | Hellrung et al. | |
| 6,447,066 B1 | 9/2002 | Chabanne et al. | |
| 6,511,129 B1 | 1/2003 | Minor et al. | |
| 6,533,357 B2 | 3/2003 | Pospeshil et al. | |
| 6,550,864 B1 | 4/2003 | Zarna et al. | |
| 6,554,362 B2 | 4/2003 | Pospeshil | |
| 6,634,713 B2 | 10/2003 | Nonomiya et al. | |
| 6,669,296 B2 | 12/2003 | Moriyama et al. | |
| 6,669,299 B2 | 12/2003 | Carlson et al. | |
| 6,698,837 B2 | 3/2004 | Pejathaya et al. | |
| 6,740,845 B2 | 5/2004 | Stol et al. | |
| 6,758,525 B2 | 7/2004 | Uramichi | |
| 6,854,802 B2 | 2/2005 | Matsuura et al. | |
| 6,857,703 B2 | 2/2005 | Bonk | |
| 6,860,562 B2 | 3/2005 | Bonk | |
| 6,869,143 B2 | 3/2005 | Secord | |
| 6,908,156 B1 | 6/2005 | Park et al. | |
| 7,025,422 B2 | 4/2006 | Fast | |
| 7,093,901 B2 | 8/2006 | Yamada | |
| 7,097,253 B2 | 8/2006 | Coughlin et al. | |
| 7,100,987 B2 | 9/2006 | Volker et al. | |
| 7,121,624 B2 | 10/2006 | Pejathaya et al. | |
| 7,152,924 B1 | 12/2006 | Nemoto et al. | |
| 7,154,065 B2 | 12/2006 | Martukanitz et al. | |
| 7,172,253 B2 | 2/2007 | Haverkamp | |
| 7,198,330 B2 | 4/2007 | Wahlen et al. | |
| 7,293,838 B2 | 11/2007 | Sugama et al. | |
| 7,296,857 B2 | 11/2007 | Shinozaki et al. | |
| 7,300,109 B2 | 11/2007 | Hofmann et al. | |
| 7,306,286 B2 | 12/2007 | Syrowik et al. | |
| 7,328,954 B2 | 2/2008 | Sasaki et al. | |
| 7,360,838 B2 | 4/2008 | Smuk | |
| 7,419,217 B2 | 9/2008 | Ishizuka | |
| 7,458,639 B2 * | 12/2008 | Thiel | B60N 2/20 297/367 R |
| 7,490,907 B2 | 2/2009 | Nagura et al. | |
| 7,503,099 B2 | 3/2009 | Pejathaya | |
| 7,527,336 B2 | 5/2009 | Kienke et al. | |
| 7,578,556 B2 | 8/2009 | Ohba et al. | |
| 7,604,297 B2 | 10/2009 | Weber | |
| 7,695,068 B2 | 4/2010 | Maeda et al. | |
| 7,775,591 B2 | 8/2010 | Hahn et al. | |
| 7,976,103 B2 | 7/2011 | Gamache et al. | |
| 8,052,215 B2 | 11/2011 | Ito | |
| 8,360,527 B2 | 1/2013 | Lehmann | |
| 8,449,034 B2 | 5/2013 | Tame et al. | |
| 8,985,690 B2 | 3/2015 | Yamada et al. | |
| 9,102,248 B2 * | 8/2015 | Matt | B60N 2/2352 |
| 9,108,541 B2 | 8/2015 | Assmann et al. | |
| 9,221,364 B2 | 12/2015 | Nock et al. | |
| 9,227,532 B2 | 1/2016 | Balzar et al. | |
| 9,296,315 B2 | 3/2016 | Hellrung | |
| 9,527,410 B2 * | 12/2016 | Leconte | B60N 2/2227 |
| 9,527,419 B2 | 12/2016 | Hosbach et al. | |
| 9,555,725 B2 | 1/2017 | Rothstein et al. | |
| 9,616,779 B2 | 4/2017 | Barzen et al. | |
| 9,623,774 B2 | 4/2017 | Yamada et al. | |
| 9,701,222 B2 | 7/2017 | Kitou | |
| 9,731,633 B2 * | 8/2017 | Veine | B60N 2/2356 |
| 9,751,432 B2 | 9/2017 | Assmann | |
| 9,873,357 B1 * | 1/2018 | McCulloch | B60N 2/236 |
| 9,889,774 B2 | 2/2018 | Espinosa et al. | |
| 10,279,709 B2 | 5/2019 | Suzuki et al. | |
| 10,610,018 B1 | 4/2020 | Madhu | |
| 10,800,296 B2 | 10/2020 | Schmitz et al. | |
| 10,864,830 B2 | 12/2020 | Schmitz et al. | |
| 11,052,797 B2 | 7/2021 | Poptani et al. | |
| 2002/0043852 A1 | 4/2002 | Uramichi | |
| 2003/0127898 A1 | 7/2003 | Niimi et al. | |
| 2003/0230923 A1 * | 12/2003 | Uramichi | B60N 2/236 297/367 R |
| 2004/0134055 A1 | 7/2004 | Aizaki | |
| 2005/0029806 A1 | 2/2005 | Yamanashi et al. | |
| 2005/0253439 A1 | 11/2005 | Sasaki et al. | |
| 2006/0006718 A1 | 1/2006 | Umezaki | |
| 2006/0012232 A1 | 1/2006 | Coughlin et al. | |
| 2006/0055223 A1 | 3/2006 | Thiel et al. | |
| 2006/0170269 A1 | 8/2006 | Oki | |
| 2007/0138854 A1 | 6/2007 | Paing et al. | |
| 2007/0200408 A1 | 8/2007 | Ohta et al. | |
| 2008/0001458 A1 | 1/2008 | Hoshihara et al. | |
| 2008/0164741 A1 | 7/2008 | Sakamoto | |
| 2009/0056124 A1 | 3/2009 | Krebs et al. | |
| 2009/0072602 A1 | 3/2009 | Schuler | |
| 2010/0072802 A1 | 3/2010 | Smith et al. | |
| 2010/0096896 A1 | 4/2010 | Nonomiya | |
| 2010/0231021 A1 | 9/2010 | Myers et al. | |
| 2010/0283304 A1 | 11/2010 | Thiel | |
| 2010/0308635 A1 | 12/2010 | Tame et al. | |
| 2010/0320823 A1 | 12/2010 | Thiel | |
| 2011/0068612 A1 | 3/2011 | Thiel | |

(56) References Cited

U.S. PATENT DOCUMENTS

| | | |
|---|---|---|
| 2011/0127814 A1 | 6/2011 | Thiel |
| 2011/0227386 A1 | 9/2011 | Berndtson et al. |
| 2012/0086253 A1 | 4/2012 | Nock et al. |
| 2012/0248841 A1 | 10/2012 | Hellrung et al. |
| 2013/0161995 A1 | 6/2013 | Yamada et al. |
| 2013/0207434 A1 | 8/2013 | Stilleke et al. |
| 2013/0270884 A1 | 10/2013 | Espinosa et al. |
| 2014/0001807 A1* | 1/2014 | McCulloch .......... A47C 1/026 297/366 |
| 2014/0091607 A1 | 4/2014 | Maeda |
| 2014/0138998 A1 | 5/2014 | Christoffel et al. |
| 2014/0159458 A1 | 6/2014 | Lu et al. |
| 2014/0225411 A1 | 8/2014 | Matt |
| 2014/0239691 A1 | 8/2014 | Hellrung |
| 2014/0301682 A1 | 10/2014 | Leppla |
| 2015/0015044 A1 | 1/2015 | Teufel et al. |
| 2015/0069809 A1 | 3/2015 | Matt |
| 2015/0091354 A1 | 4/2015 | Enokijima et al. |
| 2015/0123444 A1 | 5/2015 | Assmann |
| 2015/0266398 A1 | 9/2015 | Higashi et al. |
| 2015/0306986 A1 | 10/2015 | Jarry et al. |
| 2015/0321585 A1* | 11/2015 | McCulloch .......... B60N 2/2356 297/367 P |
| 2016/0023577 A1 | 1/2016 | Yamada et al. |
| 2016/0107546 A1 | 4/2016 | Barzen et al. |
| 2016/0339810 A1 | 11/2016 | Pluta et al. |
| 2017/0037945 A1 | 2/2017 | Maeda et al. |
| 2017/0080828 A1 | 3/2017 | Aktas |
| 2017/0088021 A1 | 3/2017 | Noguchi et al. |
| 2017/0136921 A1 | 5/2017 | Dill et al. |
| 2018/0056819 A1 | 3/2018 | Schmitz et al. |
| 2018/0103760 A1 | 4/2018 | Fujita et al. |
| 2019/0255979 A1 | 8/2019 | Zahn et al. |
| 2019/0329674 A1 | 10/2019 | Schmitz et al. |
| 2019/0337424 A1 | 11/2019 | Chang |
| 2019/0358694 A1 | 11/2019 | Yamakita |
| 2020/0047644 A1 | 2/2020 | Schmitz et al. |
| 2020/0253380 A1 | 8/2020 | Schmitz et al. |
| 2020/0282879 A1 | 9/2020 | Schmitz et al. |
| 2020/0331367 A1 | 10/2020 | Schmitz et al. |
| 2021/0039528 A1 | 2/2021 | Poptani et al. |
| 2021/0061139 A1 | 3/2021 | Schmitz et al. |

FOREIGN PATENT DOCUMENTS

| | | |
|---|---|---|
| CN | 1457306 A | 11/2003 |
| CN | 1840382 A | 10/2006 |
| CN | 101616820 A | 12/2009 |
| CN | 101925485 A | 12/2010 |
| CN | 202086037 U | 12/2011 |
| CN | 102442228 A | 5/2012 |
| CN | 103025568 A | 4/2013 |
| CN | 203228664 U | 10/2013 |
| CN | 103702860 A | 4/2014 |
| CN | 203974603 U | 12/2014 |
| CN | 105189196 A | 12/2015 |
| CN | 205097989 U | 3/2016 |
| CN | 205130981 U | 4/2016 |
| CN | 112339625 A | 2/2021 |
| DE | 4324734 A1 | 1/1995 |
| DE | 102007002366 B3 | 7/2008 |
| DE | 102008026176 A1 | 12/2009 |
| DE | 102008029438 A1 | 12/2009 |
| DE | 102011108976 A1 | 1/2013 |
| DE | 102012008940 A1 | 11/2013 |
| EP | 1074426 A2 | 2/2001 |
| GB | 1546104 A | 5/1979 |
| JP | 2000084684 A | 3/2000 |
| JP | 2002119349 A | 4/2002 |
| JP | 5290789 B2 | 9/2013 |
| JP | 5555969 B2 | 7/2014 |
| KR | 100601809 B1 | 7/2006 |
| KR | 100817000 B1 | 3/2008 |
| KR | 20090035633 A | 4/2009 |
| KR | 20140001651 A | 1/2014 |
| KR | 101420164 B1 | 7/2014 |
| KR | 101655777 B1 | 9/2016 |
| WO | WO-9620848 A1 | 7/1996 |
| WO | WO-2011069107 A2 | 6/2011 |
| WO | WO-2013167240 A1 | 11/2013 |

OTHER PUBLICATIONS

International Search Report regarding International Application No. PCT/US2020/021377, dated Jun. 30, 2020.

Written Opinion of the International Searching Authority regarding International Application No. PCT/US2020/021377, dated Jun. 30, 2020.

U.S. Appl. No. 16/740,874, filed Jan. 13, 2020, Ralph L. Schmitz et al.

U.S. Appl. No. 16/811,112, filed Mar. 6, 2020, Ralph L. Schmitz et al.

U.S. Appl. No. 16/842,135, filed Apr. 7, 2020, Ralph L. Schmitz et al.

U.S. Appl. No. 16/914,569, filed Jun. 29, 2020, Sapan Mahendra Poptani et al.

U.S. Appl. No. 16/996,991, filed Aug. 19, 2020, Ralph L. Schmitz et al.

U.S. Appl. No. 17/181,189, filed Feb. 22, 2021, Ralph L. Schmitz et al.

SPI Lasers UK Ltd., "Opening new possibilities with single mode oscillation welding (CW)." Presented at: Laser World of Photonics China; Shanghai, China (Mar. 2008).

Office Action regarding German Patent Application No. 102019211855.0, dated Feb. 4, 2021. Partial translation provided by Bardehle Pagenberg Partnerschaft mbB.

Office Action regarding Canadian Patent Application No. 2,812,408, dated Jun. 17, 2016.

Office Action regarding German Patent Application No. 102019212517.4, dated Mar. 11, 2021. Partial translation provided by Bardehle Pagenberg Partnerschaft mbB.

Office Action regarding Indian Patent Application No. 201921032346, dated Mar. 18, 2021.

Office Action regarding Chinese Patent Application No. 201910334168.9, dated Apr. 30, 2021. Translation provided by Unitalen Attorneys at Law.

Office Action regarding German Patent Application No. 102013103671.6, dated May 20, 2021. Translation provided by Witte, Weller & Partner Patentanwälte mbB.

U.S. Appl. No. 16/378,950, filed Apr. 9, 2019, Ralph L. Schmitz et al.

U.S. Appl. No. 16/524,325, filed Jul. 29, 2019, Ralph L. Schmitz et al.

First Chinese Office Action regarding Application No. 201910801476.8 dated Aug. 10, 2021. Partial English translation provided by Unitalen Attorneys at Law.

Office Action regarding Chinese Patent Application No. 201910801476.8, dated Dec. 17, 2021.

\* cited by examiner

RECLINER HEART FOR SEAT RECLINER ASSEMBLY

CROSS-REFERENCE TO RELATED APPLICATIONS

This application claims the benefit of U.S. Provisional Application No. 62/724,068, filed on Aug. 29, 2018. The entire disclosure of the above application is incorporated herein by reference.

FIELD

The present disclosure relates to a recliner heart for a seat recliner assembly.

BACKGROUND

This section provides background information related to the present disclosure and is not necessarily prior art.

Vehicle seats often include a recliner heart that can rotate a seatback relative to a seat bottom. Such vehicle seats can also include a release mechanism (or dump mechanism) to enable the seatback to be quickly moved from a relatively upright position to a forward dump position (e.g., to enable a passenger to ingress into and egress out of a space behind the seat such as a rear seating row). A release lever (or actuation lever) can be mounted on an upper, outboard portion of the seatback and can be connected to the release mechanism by a cable and/or link. The release lever can be manually moved by a user to actuate the release mechanism. Actuation of the release lever may also cause movement of a manual recliner handle (i.e., the handle that a user can actuate to adjust a position of the seatback between upright and reclined positions) and/or a spring attached to the manual recliner handle. Because the actuation of the release lever also moves the spring and/or manual recliner handle, a large amount of force may be necessary to actuate the release lever.

SUMMARY

This section provides a general summary of the disclosure, and is not a comprehensive disclosure of its full scope or all of its features.

In one form, the present disclosure provides a recliner heart. The recliner heart includes first, second and third locking plates and a pawl. The first locking plate defines a recess. The second locking plate includes a first inner diametrical surface having first teeth formed thereon. The third locking plate is disposed between the first and second locking plates and includes a second inner diametrical surface and an outer diametrical surface. The second inner diametrical surface has a notch formed therein. The outer diametrical surface has second teeth formed thereon. Some of the second teeth are meshingly engaged with some of the first teeth. The pawl is slidably disposed in the recess between a secure position in which the pawl is engaged with the notch of the third locking plate and a release position in which the pawl is disengaged from the notch of the third locking plate.

In some configurations of the recliner heart of the above paragraph, the third locking plate includes a first section and a second section. The first section includes the second inner diametrical surface having a notch formed therein and the second section includes the outer diametrical surface having second teeth formed thereon.

In some configurations of the recliner heart of any one or more of the above paragraphs, the first section defines a first opening and the second section defines a second opening. The first opening has a diameter that is larger than a diameter of the second opening.

In some configurations of the recliner heart of any one or more of the above paragraphs, the first locking plate includes a plurality of protrusions. The pawl is disposed in the recess defined between two of the plurality of protrusions.

In some configurations of the recliner heart of any one or more of the above paragraphs, a first cam engages the pawl and causes the pawl to slide to the secure position.

In some configurations of the recliner heart of any one or more of the above paragraphs, the first cam extends through the first locking plate.

In some configurations of the recliner heart of any one or more of the above paragraphs, a spring engages the first cam and biases the pawl to the secure position.

In some configurations of the recliner heart of any one or more of the above paragraphs, a pivot plate extends through the second locking plate.

In some configurations of the recliner heart of any one or more of the above paragraphs, a second cam is rotationally fixed to the pivot plate.

In some configurations of the recliner heart of any one or more of the above paragraphs, the second and third locking plates, the pivot plate and the second cam are permitted to rotate without corresponding rotation of the first cam and the first locking plate when the pawl is disengaged from the notch of the third locking plate.

In some configurations of the recliner heart of any one or more of the above paragraphs, the second locking plate, the pivot plate and the second cam are permitted to rotate without corresponding rotation of the first cam and the first and third locking plates when the pawl is engaged with the notch of the third locking plate.

In some configurations of the recliner heart of any one or more of the above paragraphs, a center point of the third locking plate is offset from a center point of the second locking plate.

In some configurations of the recliner heart of any one or more of the above paragraphs, an encapsulating ring is attached to the first locking plate and covers a periphery of the first, second and third locking plates.

In another form, the present disclosure provided another recliner heart. The recliner heart includes first, second and third locking plates and a first pawl. The first locking plate defines a first recess. The third locking plate is disposed between the first and second locking plates and includes a first inner diametrical surface and a second inner diametrical surface. The first inner diametrical surface has a notch formed therein. The first pawl is slidably disposed in the first recess between a secure position in which the first pawl is engaged with the notch of the third locking plate and a release position in which the first pawl is disengaged from the notch of the third locking plate.

In some configurations of the recliner heart of the above paragraph, the third locking plate includes a partition disposed between the first and second inner diametrical surfaces. The partition extends radially inward.

In some configurations of the recliner heart of any one or more of the above paragraphs, the first locking plate includes a plurality of first protrusions. The first pawl is disposed in the first recess defined between two of the plurality of first protrusions.

In some configurations of the recliner heart of any one or more of the above paragraphs, a cam engages the first pawl and causes the first pawl to slide to the secure position.

In some configurations of the recliner heart of any one or more of the above paragraphs, the cam extends through the first locking plate.

In some configurations of the recliner heart of any one or more of the above paragraphs, a spring engages the cam and biases the first pawl to the secure position.

In some configurations of the recliner heart of any one or more of the above paragraphs, a second pawl is slidably disposed in the second recess between a secure state in which the second pawl is engaged with the teeth of the third locking plate and a release state in which the second pawl is disengaged from the teeth of the third locking plate.

In some configurations of the recliner heart of any one or more of the above paragraphs, the first locking plate is permitted to rotate without corresponding rotation of the second and third locking plates when the first pawl is disengaged from the notch of the third locking plate and the second pawl is engaged with the teeth of the third locking plate.

In some configurations of the recliner heart of any one or more of the above paragraphs, the first and third locking plates are permitted to rotate without corresponding rotation of the second locking plate when the second pawl is disengaged from the teeth of the third locking plate and the first pawl is engaged with the notch of the first locking plate.

In some configurations of the recliner heart of any one or more of the above paragraphs, the second locking plate includes a plurality of second protrusions. The second pawl is disposed in the second recess defined between two of the plurality of second protrusions.

In some configurations of the recliner heart of any one or more of the above paragraphs, a cam engages the second pawl and causes the second pawl to slide to the secure state.

In some configurations of the recliner heart of any one or more of the above paragraphs, a connector disk rotationally fixed to the cam.

In some configurations of the recliner heart of any one or more of the above paragraphs, the cam and the connector disk are disposed between the first and second locking plates.

In some configurations of the recliner heart of any one or more of the above paragraphs, a spring engages the connector disk and biases the second pawl to the secure state.

In some configurations of the recliner heart of any one or more of the above paragraphs, an encapsulating ring is attached to the second locking plate and covers a periphery of the first and third locking plates.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
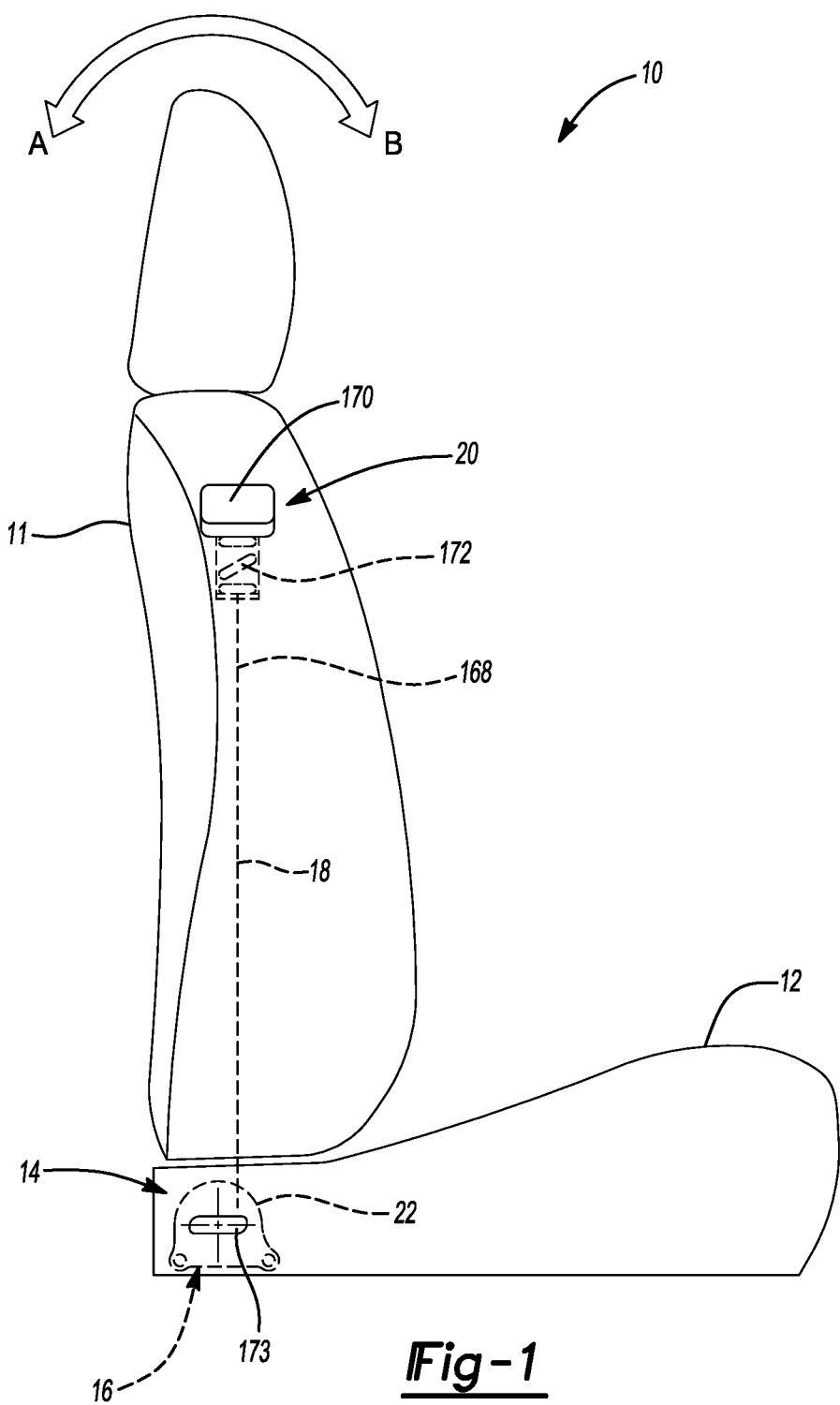
FIG. 1 is a side view of a vehicle seat assembly in an upright position according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
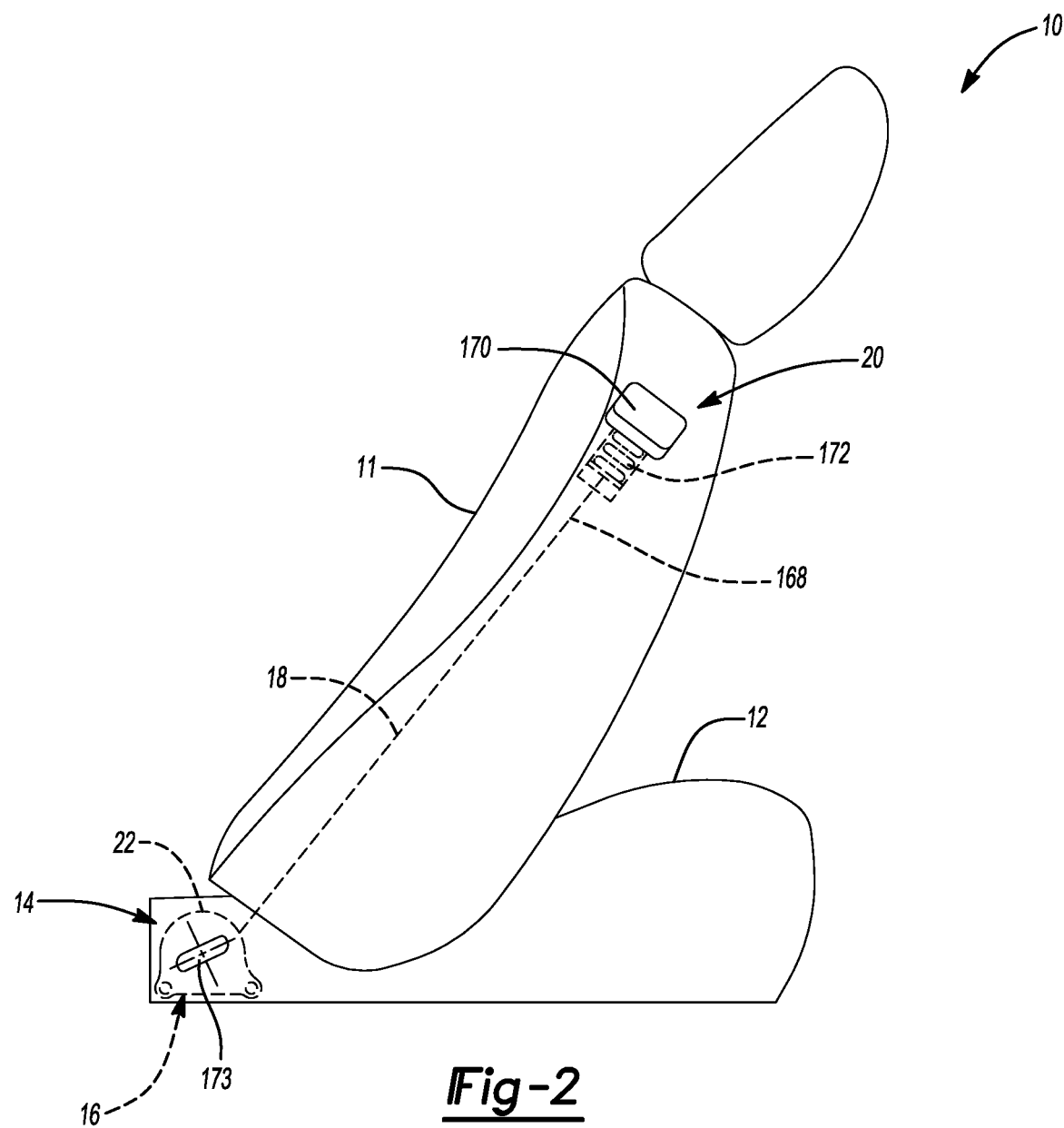
FIG. 2 is a side view of the vehicle seat assembly of FIG. 1 with a seatback in a forward dump position.

With reference to FIGS. 1 and 2, a vehicle seat assembly 10 is shown. The vehicle seat assembly 10 may be positioned within a vehicle (not shown) and may include a seatback 11 attached to a seat bottom 12. A seat adjustment mechanism 14 may be operatively attached to the vehicle seat assembly 10 and may include a recliner assembly 16, a cable 18, and an actuation assembly 20. The recliner assembly 16 may be connected to the actuation assembly 20 via the cable 18 and/or one or more links (not shown). The recliner assembly 16 may also be attached to the seatback 11 and the seat bottom 12 of the vehicle seat assembly 10. The recliner assembly 16 may be operable in a locked state preventing relative rotation between the seatback 11 and the seat bottom 12 and an unlocked state permitting relative rotation between the seatback 11 and the seat bottom 12 among an upright position (FIG. 1), a rearward reclined position (not shown) and a forward dump position (FIG. 2).

Figure 3:
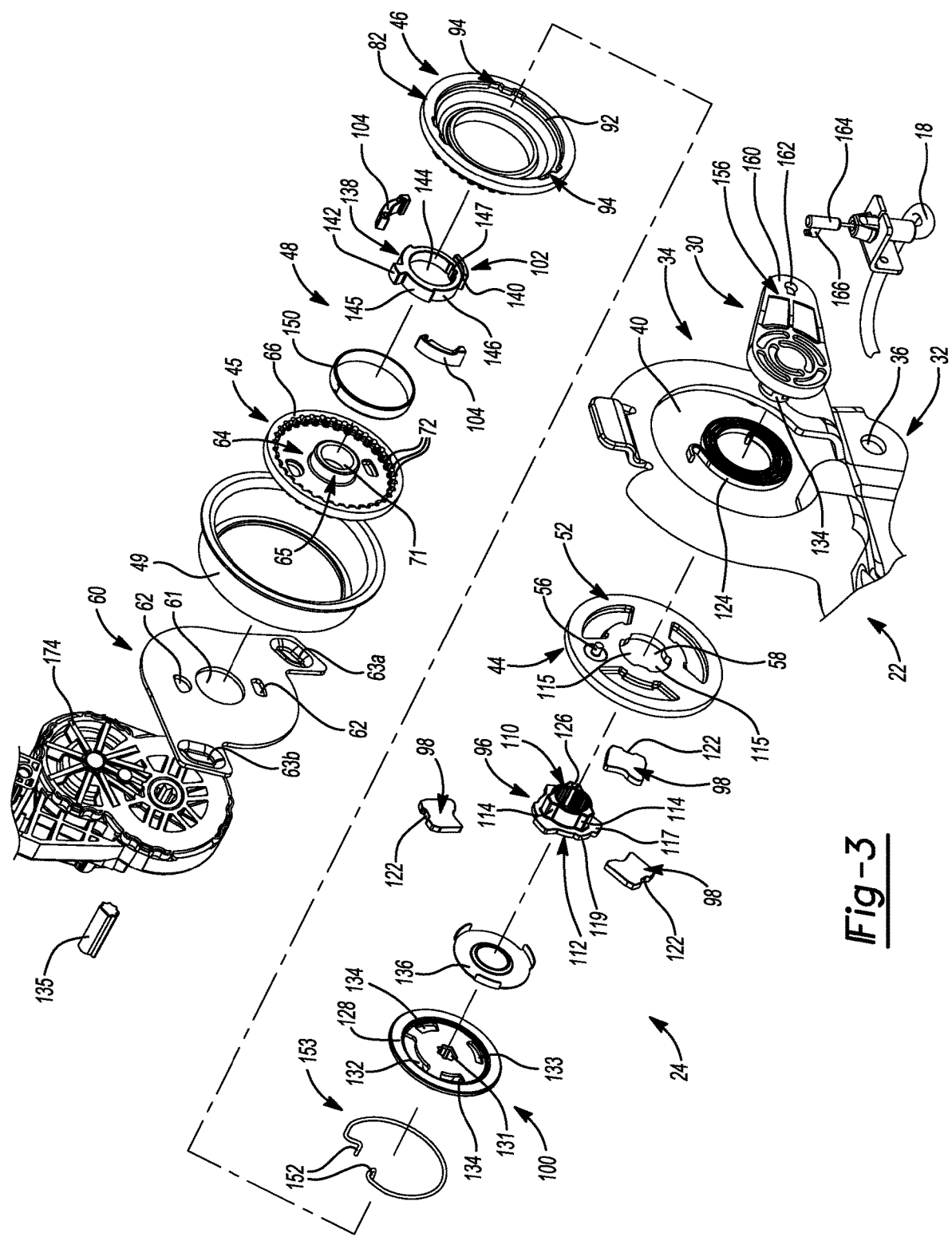
FIG. 3 is an exploded perspective view of a recliner assembly of a seat adjustment mechanism of FIG. 1.
Figure 4:
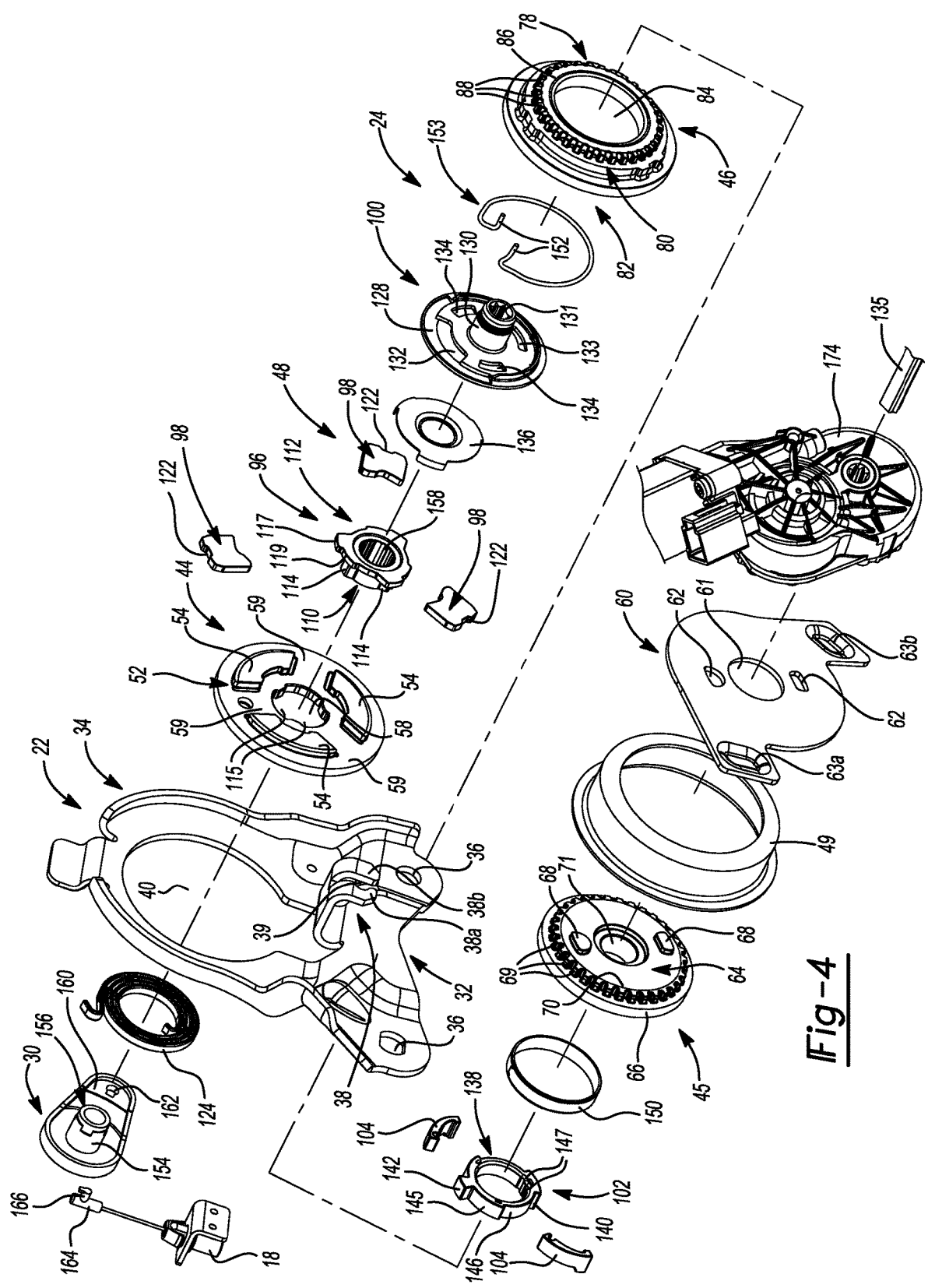
FIG. 4 is another exploded perspective view of the recliner assembly of the seat adjustment mechanism of FIG. 3.
Figure 5:
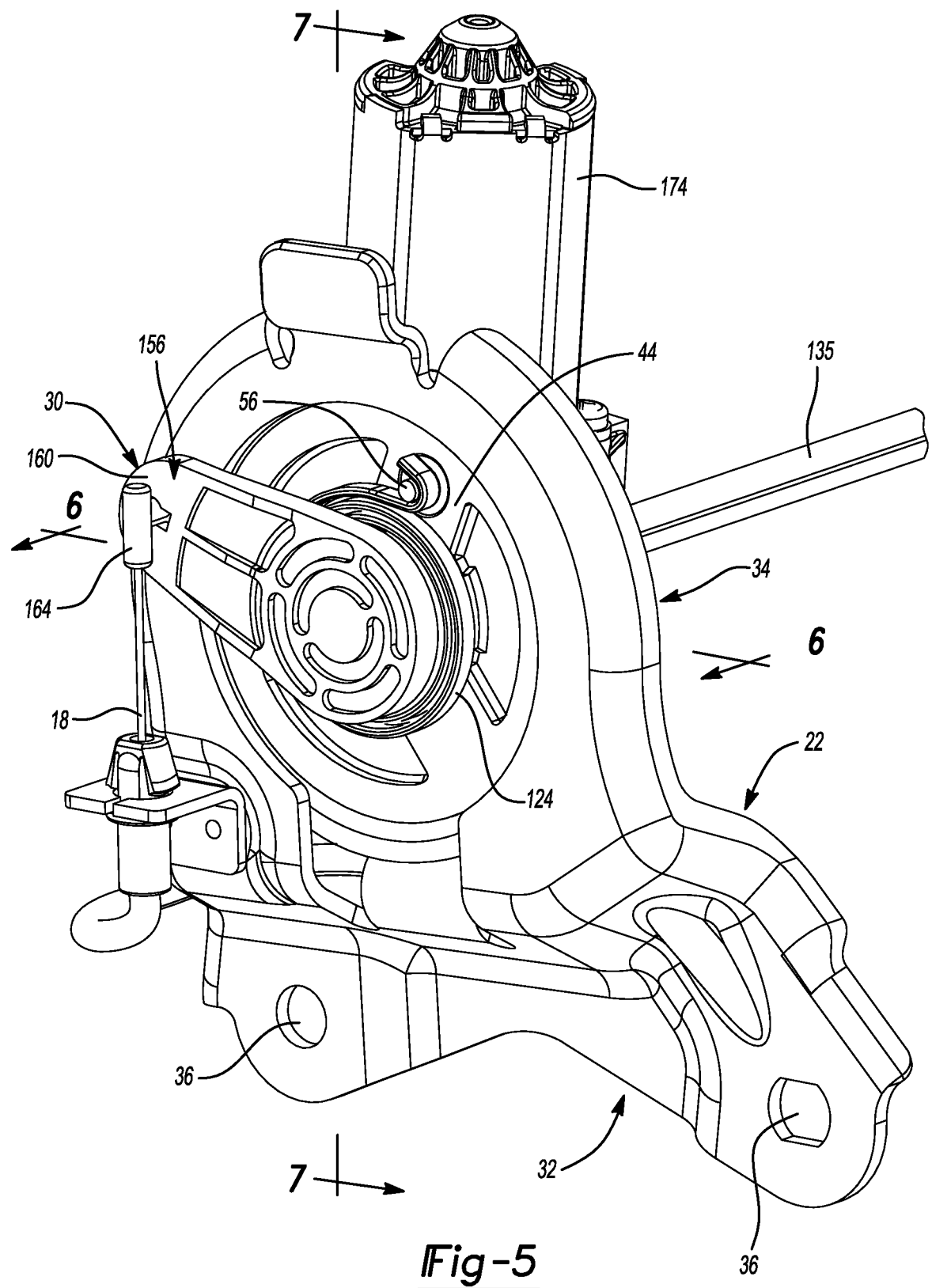
FIG. 5 is a perspective view of the recliner assembly with a recliner heart in a locked state.

With reference to FIGS. 3-13, the recliner assembly 16 may include a housing plate 22, a recliner heart 24 (FIGS. 3 and 4) and an unlock lever 30. The housing plate 22 may be attached to the seat bottom 12 of the vehicle seat assembly 10. As shown in FIG. 4, the housing plate 22 may include a first portion 32 and a second portion 34. The first portion 32 may include a plurality of apertures 36 and a tab 38. Fasteners (not shown) may extend through the plurality of apertures 36 to securely attach the housing plate 22 to the seat bottom 12. The tab 38 includes a first member 38a and a second member 38b that may limit or restrict the rotation of the seatback 11 in the rearward recline position and the forward dump position. The tab 38 may also define a slot 39 between the first member 38a and the second member 38b for mounting a spring (not shown) that provides a torque to return the seatback 11 from the rearward recline position (not shown) to the upright position (FIG. 1). The second portion 34 may be substantially circular and define an opening 40 in a central portion thereof. As shown in FIGS. 3 and 4, the second portion 34 may include a tab 43 that is positioned above the opening 40 and extend outwardly from a periphery of the second portion 34.

The recliner heart 24 may be mounted to the housing plate 22 and may selectively permit relative rotation between the seatback 11 and the seat bottom 12. The recliner heart 24 may be a round recliner heart, for example, or any other suitable type of recliner heart. As shown in FIGS. 3 and 4, the recliner heart 24 may include a first locking plate 44, a second locking plate 45, a third locking plate 46, a locking assembly 48 and an encapsulating ring 49.

Figure 7:
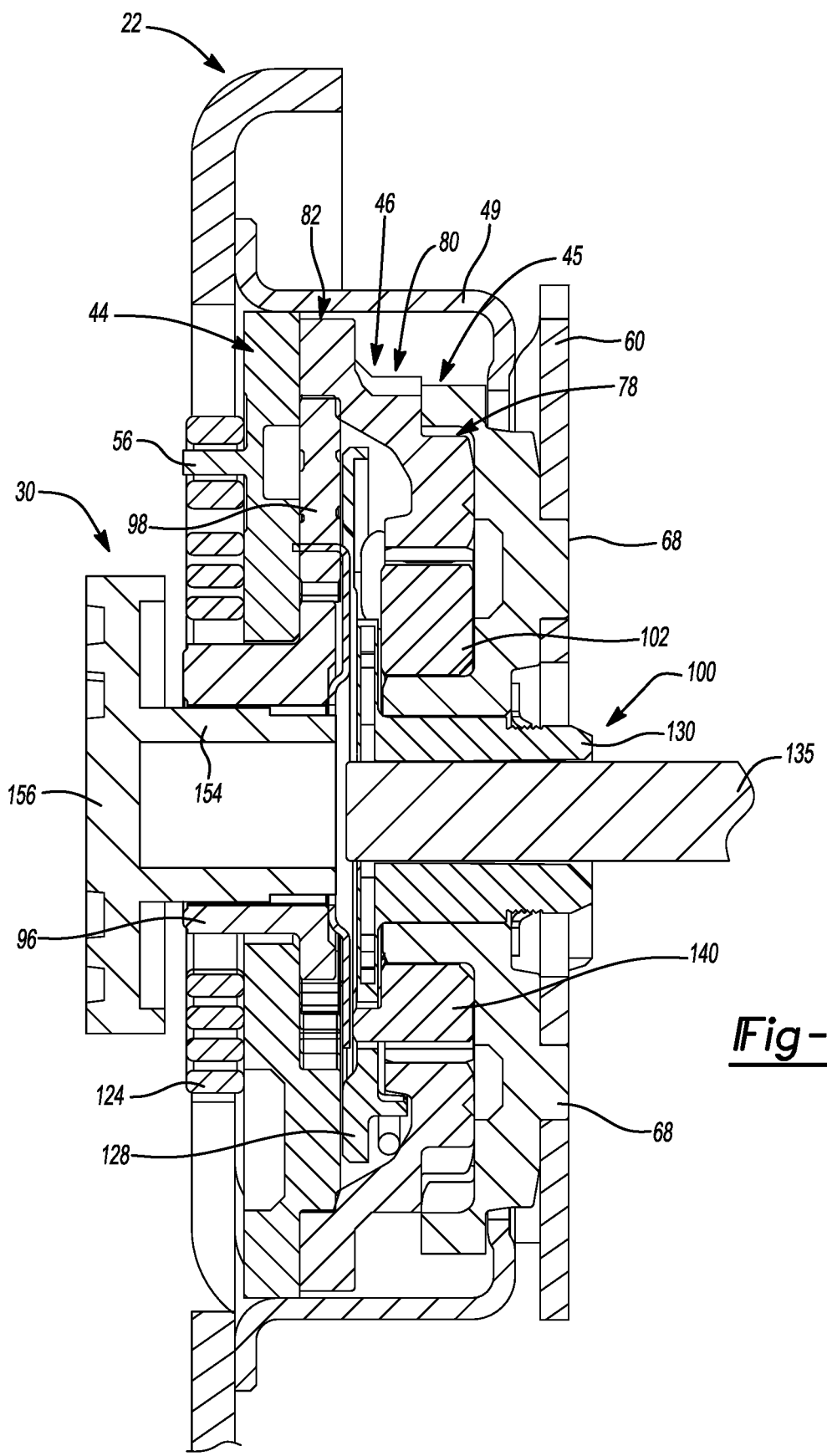
FIG. 7 is another cross-sectional view of the recliner assembly taken along line 7-7 of FIG. 5.
Figure 11:
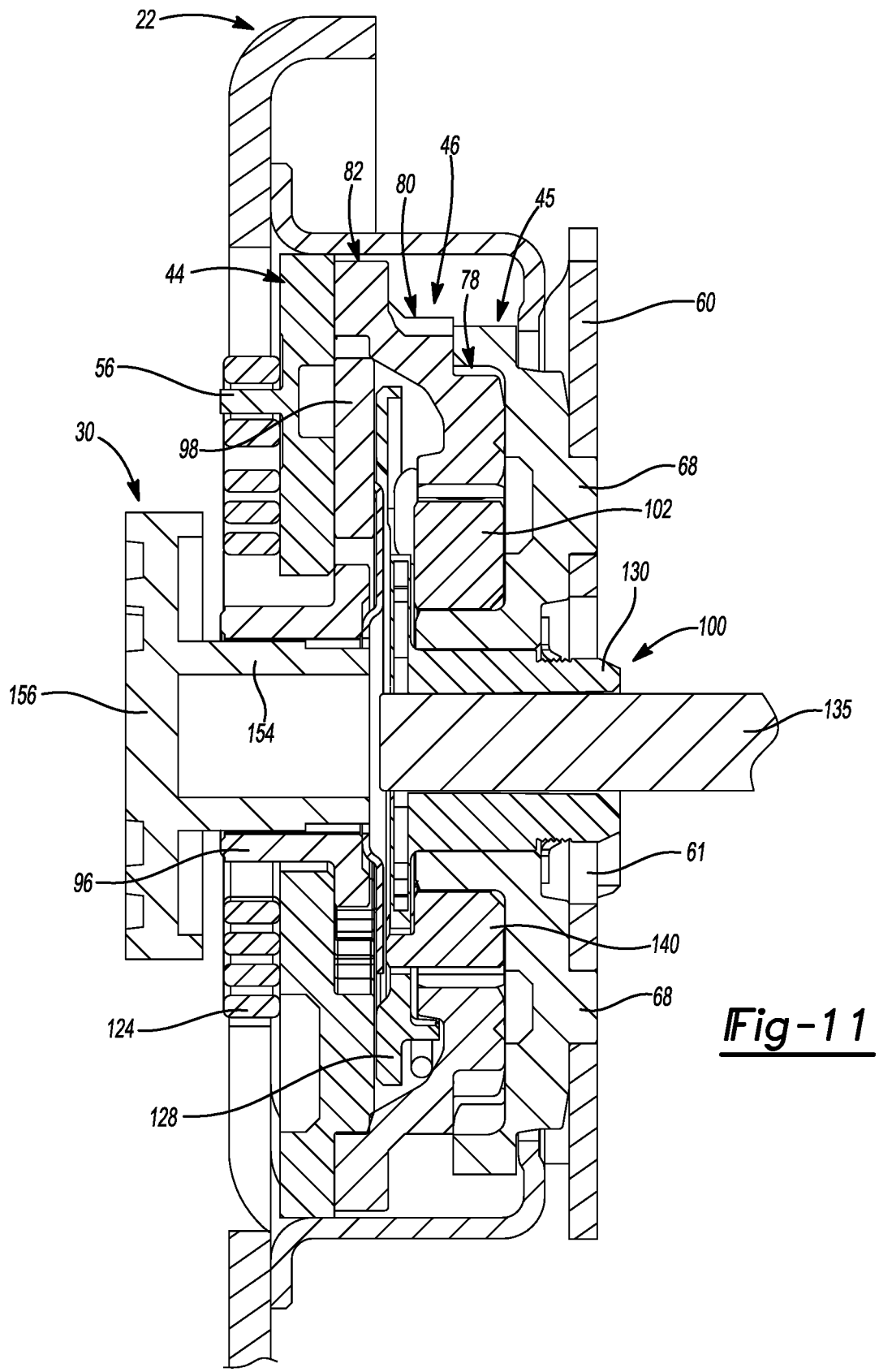
FIG. 11 is another cross-sectional view of the recliner assembly taken along line 11-11 of FIG. 9.
Figure 12:
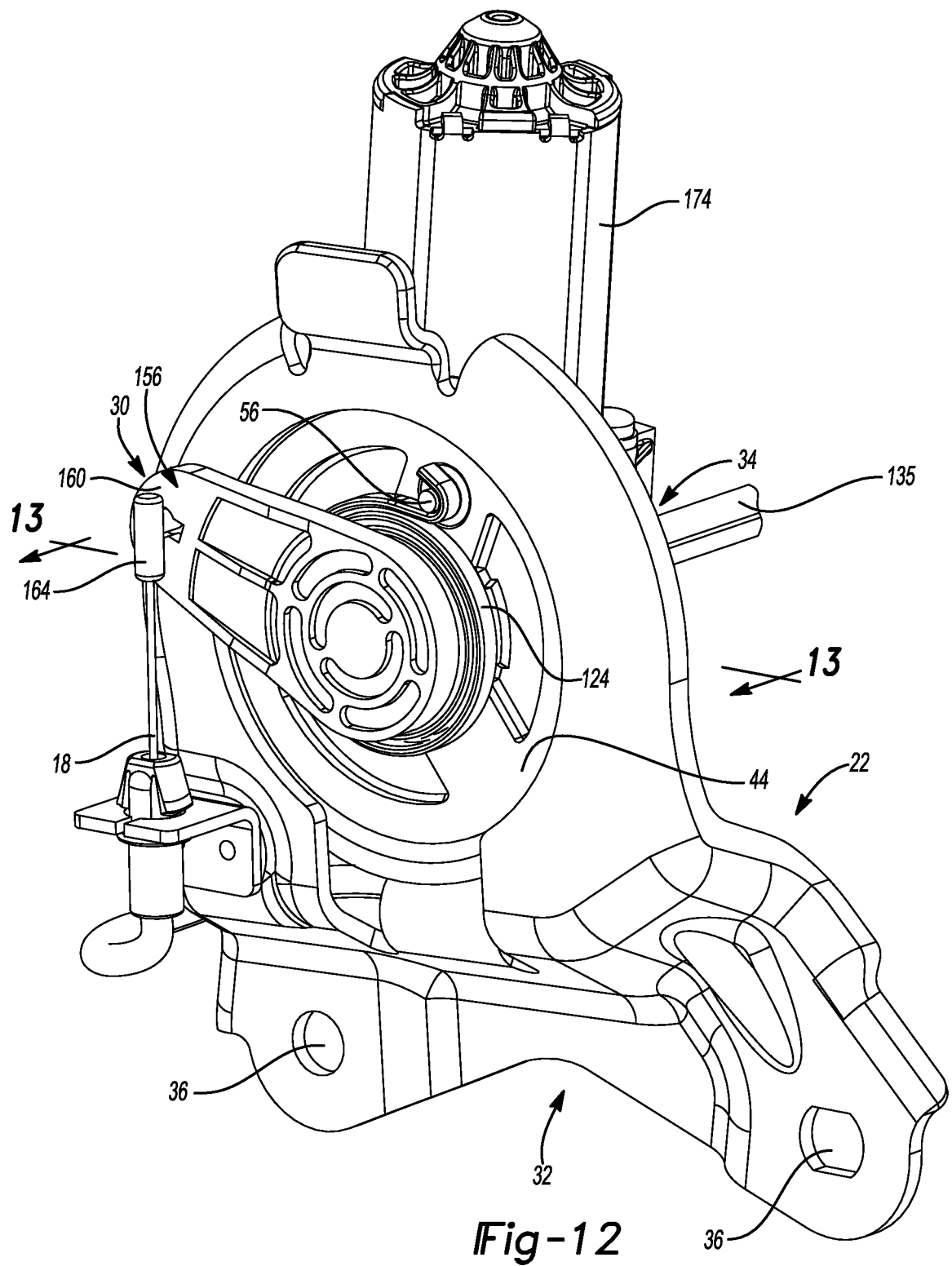
FIG. 12 is a perspective view of the recliner assembly with the recliner heart is an unlocked and forward position.

The first locking plate 44 may be rotationally fixed relative to the seat bottom 12 and may be attached (e.g., laser welded) to the encapsulating ring 49 (FIGS. 7 and 11). In some configurations, the first locking plate 44 may also be attached to the housing plate 22. The first locking plate 44 may be a generally circular shape and may include a main body 52 having a plurality of protrusions 54 (FIG. 4), a spring post 56, and a central aperture 58 formed therethrough. The first protrusions 54 may extend from the main body 52 and are generally arcuate in shape. The first protrusions 54 may cooperate to form a plurality of guide recesses 59 that support at least a portion of the locking assembly 48. The spring post 56 may extend from the main body 52 opposite the direction of the protrusions 54.

An attachment plate 60 may be attached (e.g., laser welded) to and between the seat back frame (not shown) and the second locking plate 45 such that the attachment plate 60 is operatively connected with the seatback 11. In this way, rotation of the seatback 11 causes corresponding rotation of the attachment plate 60 and the second locking plate 45. As shown in FIGS. 3 and 4, the attachment plate 60 may include a first opening 61 extending through a center portion thereof, second openings 62 and a pair of wings 63a, 63b protruding from a periphery of the attachment plate 60. The locking assembly 48 may extend through the first opening 61. The wing 63a contacts the first member 38a of the tab 38 when the seatback 11 is in the rearward recline position to limit further rotation of the seatback 11 in the rearward recline position and the wing 63b contacts the second member 38b of the tab 38 when the seatback 11 is in the forward dump positon to further limit rotation of the seatback 11 in the forward dump position.

As shown in FIGS. 3 and 4, the second locking plate 45 may be a generally circular shape and may include a plate body 64, a hub 65 (FIG. 3) and a rim 66. The plate body 64 may include projections 68 and teeth 69. The projections 68 may extend from a surface of the plate body 64 and may be received in respective second openings 62 of the attachment plate 60 (FIGS. 7 and 11), thereby further coupling the second locking plate 45 and the attachment plate 60. The teeth 69 may extend 360 degrees around an outer diametrical surface 70 of the plate body 64. The hub 65 may extend from a center portion of the plate body 64 in a direction opposite of the projections 68 and may define an opening 71 extending therethrough. The rim 66 may extend 360 degrees around a periphery of the plate body 64 and may include teeth 72 that extends 360 degrees around an inner diametrical surface 73 of the rim 66.

The third locking plate 46 may include a generally circular shape and may be disposed between the first and second locking plates 44, 45. As shown in FIGS. 4, 7 and 11, the third locking plate 46 may include an inner section 78, an intermediate section 80 and an outer section 82. As shown in FIG. 4, the inner section 78 may define an opening 84 and may include an outer diametrical surface 86 having teeth 88 formed thereon. At least a portion of the teeth 88 may be meshingly engaged with at least a portion of the teeth 72 of the second locking plate 45. The intermediate section 80 may define an opening that has a diameter that is larger than a diameter of the opening of the inner section 78. The outer section 82 may define an opening and may include an inner diametrical surface 92 having notches 94 formed therein.

Figure 6:
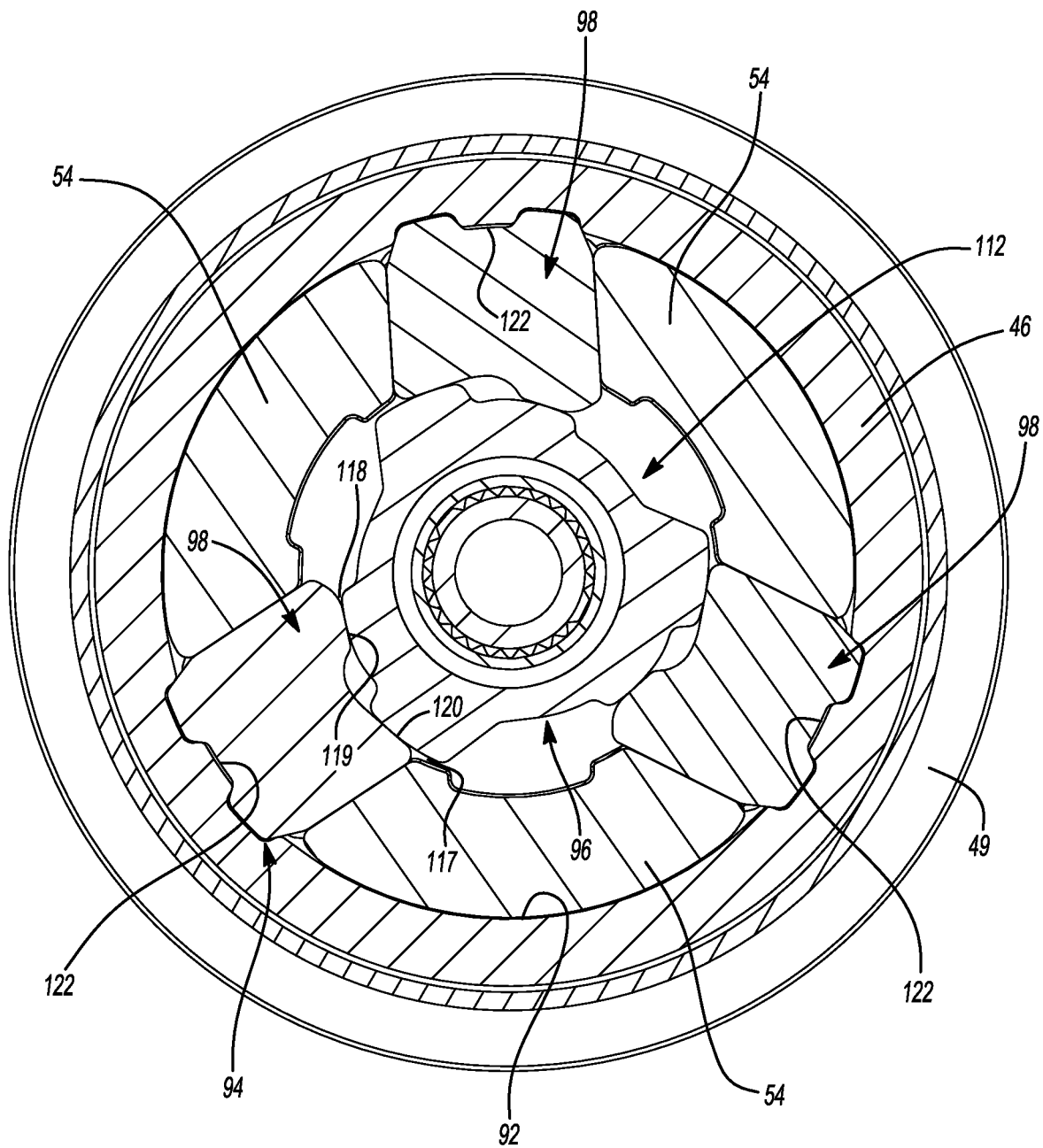
FIG. 6 is a cross-sectional view of the recliner assembly taken along line 6-6 of FIG. 5.

As shown in FIGS. 3 and 4, the locking assembly 48 may include a first cam 96, pawls 98, a pivot plate 100, a second cam 102 and wedges 104. The first cam 96 may extend through the aperture 58 of the first locking plate 44 and may engage the unlock lever 30 (FIGS. 7 and 11). The first cam 96 may include a shaft portion 110 and a disk portion 112. The shaft portion 110 may engage the unlock lever 30 such that actuation of the actuation assembly 20 rotates the unlock lever 30 and the first cam 96. The shaft portion 110 may include radially extending projections 114 that extend through grooves 115 at a periphery of the aperture 58 of the first locking plate 44. The disk portion 112 may include a plurality of first cam lobes 117 and a plurality of second cam lobes 119 that may selectively engage the pawls 98 (FIG. 6).

Figure 10:
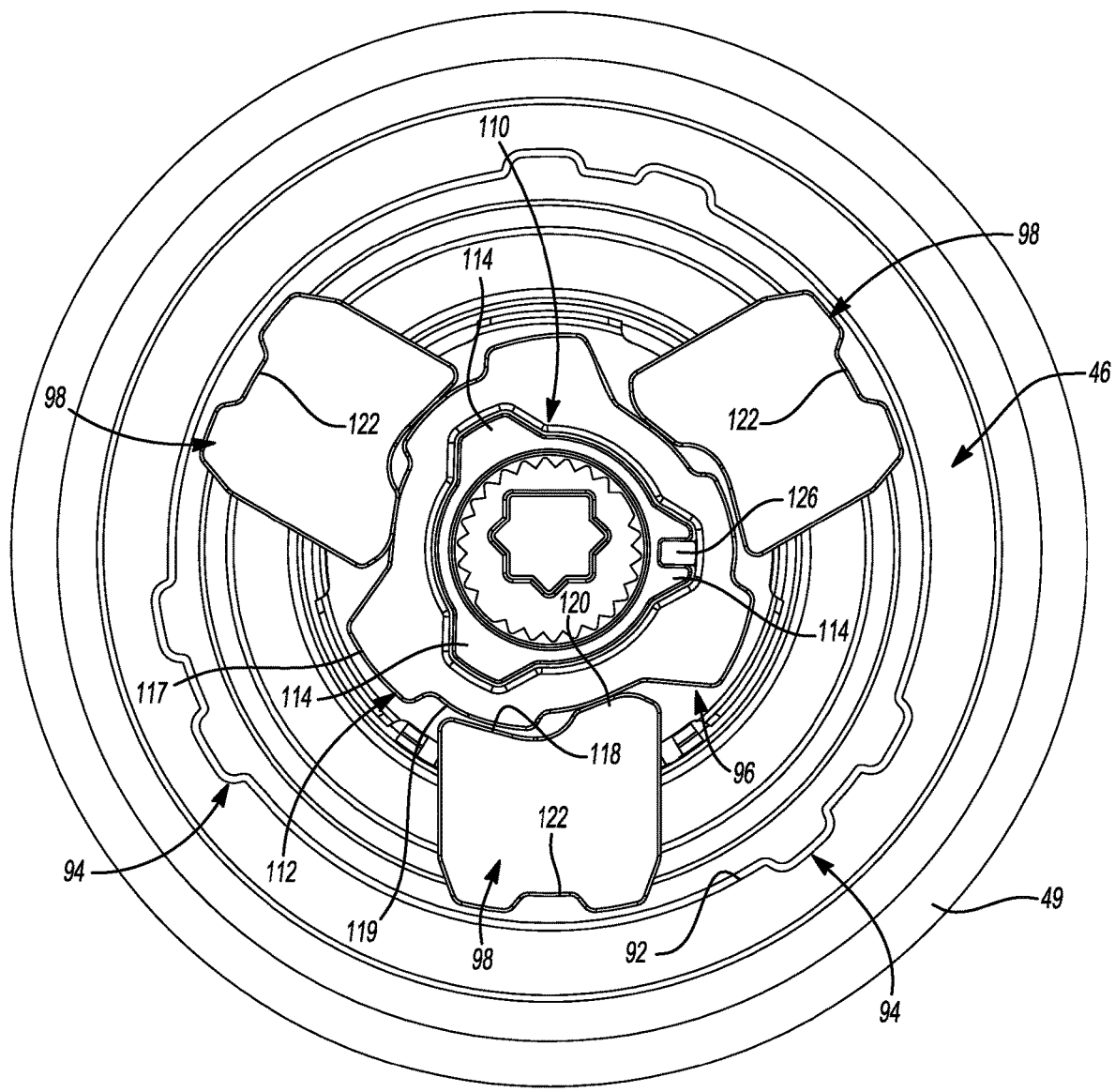
FIG. 10 is a cross-sectional view of the recliner assembly taken along line 10-10 of FIG. 9.

The pawls 98 may be radially disposed around the central aperture 58 of the first locking plate 44 with each pawl 98 slidably mounted in a corresponding guide recess 59 between a secure position (FIG. 6) and a release position (FIG. 10; note seatback 11 is in forward dump position in FIG. 10). Each pawl 98 may include a pair of engagement members 118, 120 and a locking member 122 formed generally on an opposite end of the pawls 98 relative to the engagement members 118, 120.

A coiled spring 124 may be attached to the spring post 56 at one end and received in a groove 126 formed in one of the projections 114 of the shaft portion 110 at another end such that the unlock lever 30 is rotationally biased toward a locked position. The coiled spring 124 may also engage the shaft portion 110 such that the first cam 96 is rotationally biased in a manner that causes the engagement members 118 to force the pawls 98 outwardly to the secure position (FIG. 6).

The pivot plate 100 may extend through the opening 71 of the second locking plate 45 (FIGS. 7 and 11) and may include a body 128, a stem portion 130 and an aperture 131 extending through the body 128 and the stem portion 130. As shown in FIGS. 3 and 4, the body 128 may be a generally circular shape and may have a first aperture 132, a second aperture 133 and third apertures 134 formed therein. A circular shaped partition member 136 (FIGS. 3 and 4) may be disposed between the body 128 of the pivot plate 100 and the first cam 96 such that rotation of the first cam 96 does not cause rotation of the pivot plate 100 and vice versa. The stem portion 130 may extend from a center of the body 128 through the opening 71 of the second locking plate 45. A cross rod 135 may be received in the aperture 131 of the pivot plate 100 such that the pivot plate 100 is drivingly engaged thereto. In this way, rotation of the cross rod 135 causes corresponding rotation of the pivot plate 100.

The second cam 102 may be disposed over the hub 65 of the second locking plate 45 and may include a body 138, an attachment portion 140 and a distal portion 142. The body 138 may be circular in shape and may define an aperture 144 that receives the hub 65 of the second locking plate 45. The body 138 may have a first portion 145 and a second portion 146. The first portion 145 may have a thickness that is greater than a thickness of the second portion 146 of the body 138. Grooves 147 may be formed in an inner diametrical surface 148 of the body 138 (FIGS. 3 and 4).

The attachment portion 140 may be rectangular-shaped and may be integrally attached to an outer surface of the second portion 146 of the body 138. The attachment portion 140 may include an end that extends through the second aperture 133 of the body 128 (FIGS. 7 and 11) such that the second cam 102 and the pivot plate 100 are rotationally fixed to each other. The distal portion 142 may be integrally attached to an outer surface of the first portion 145 such that it is 180 degrees opposite the attachment portion 140.

Figure 8:
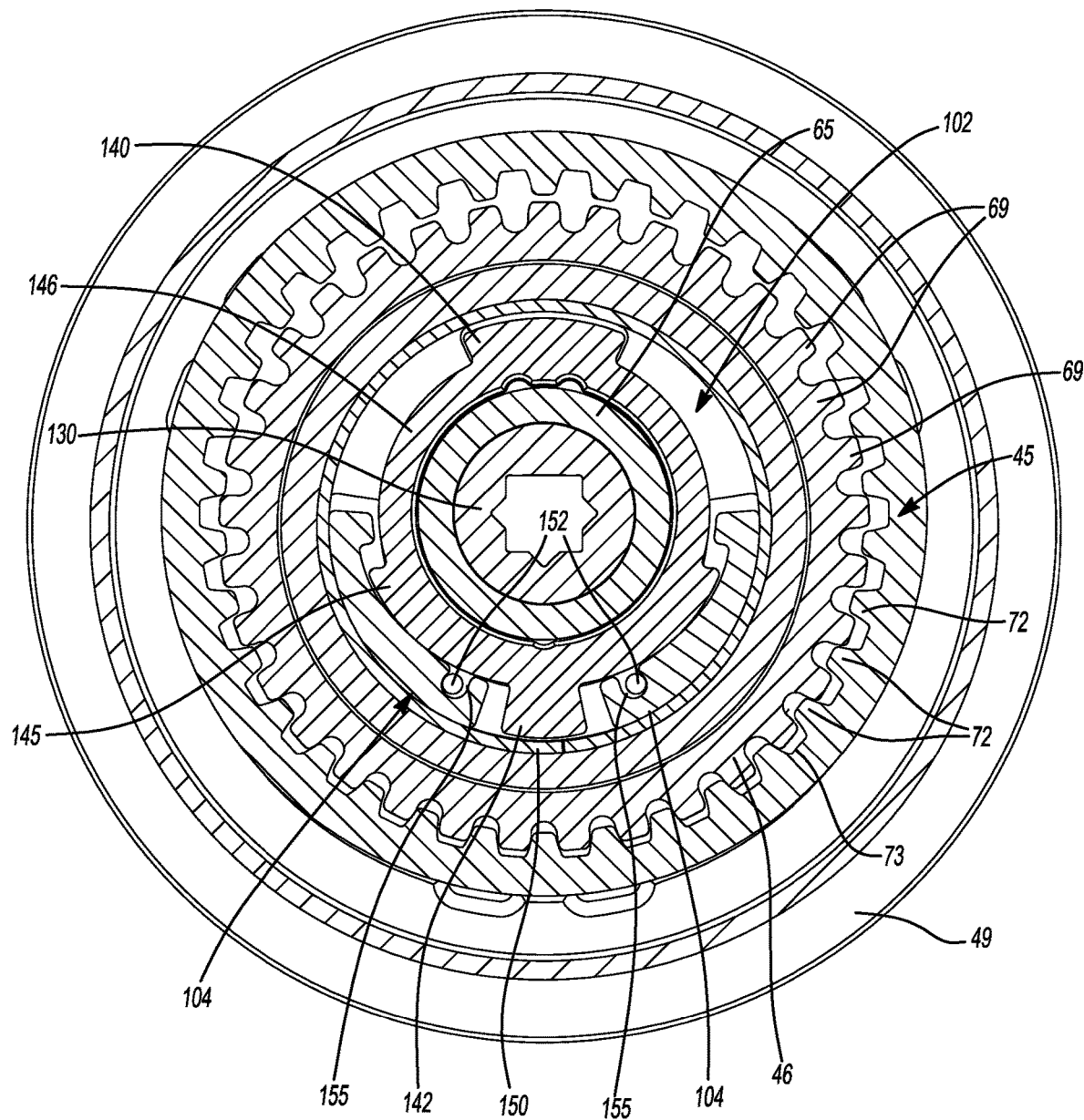
FIG. 8 is another cross-sectional view of the recliner heart in the position of FIG. 5.
Figure 9:
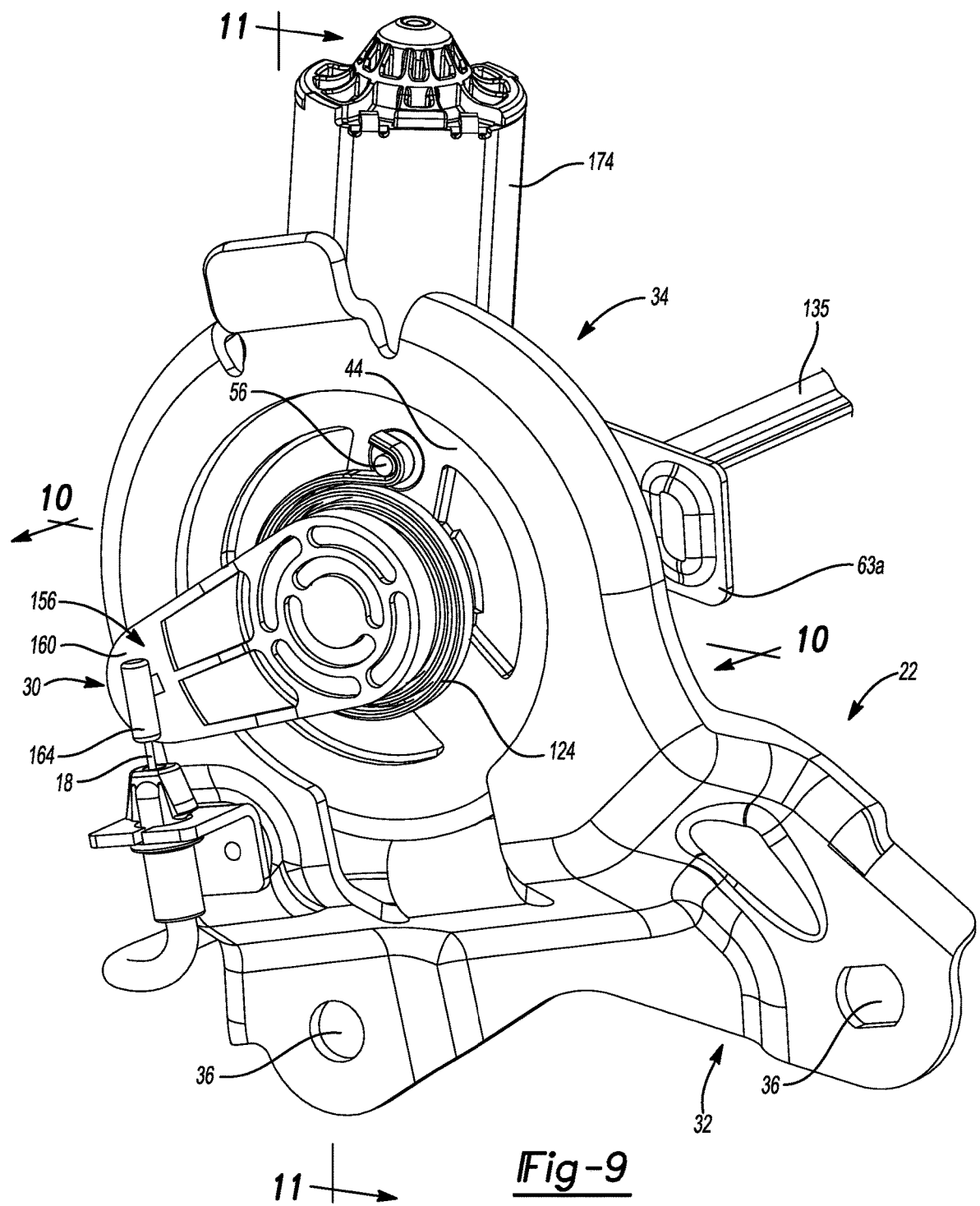
FIG. 9 is a perspective view of the recliner assembly with the recliner heart in an unlocked and forward dump position.
Figure 13:
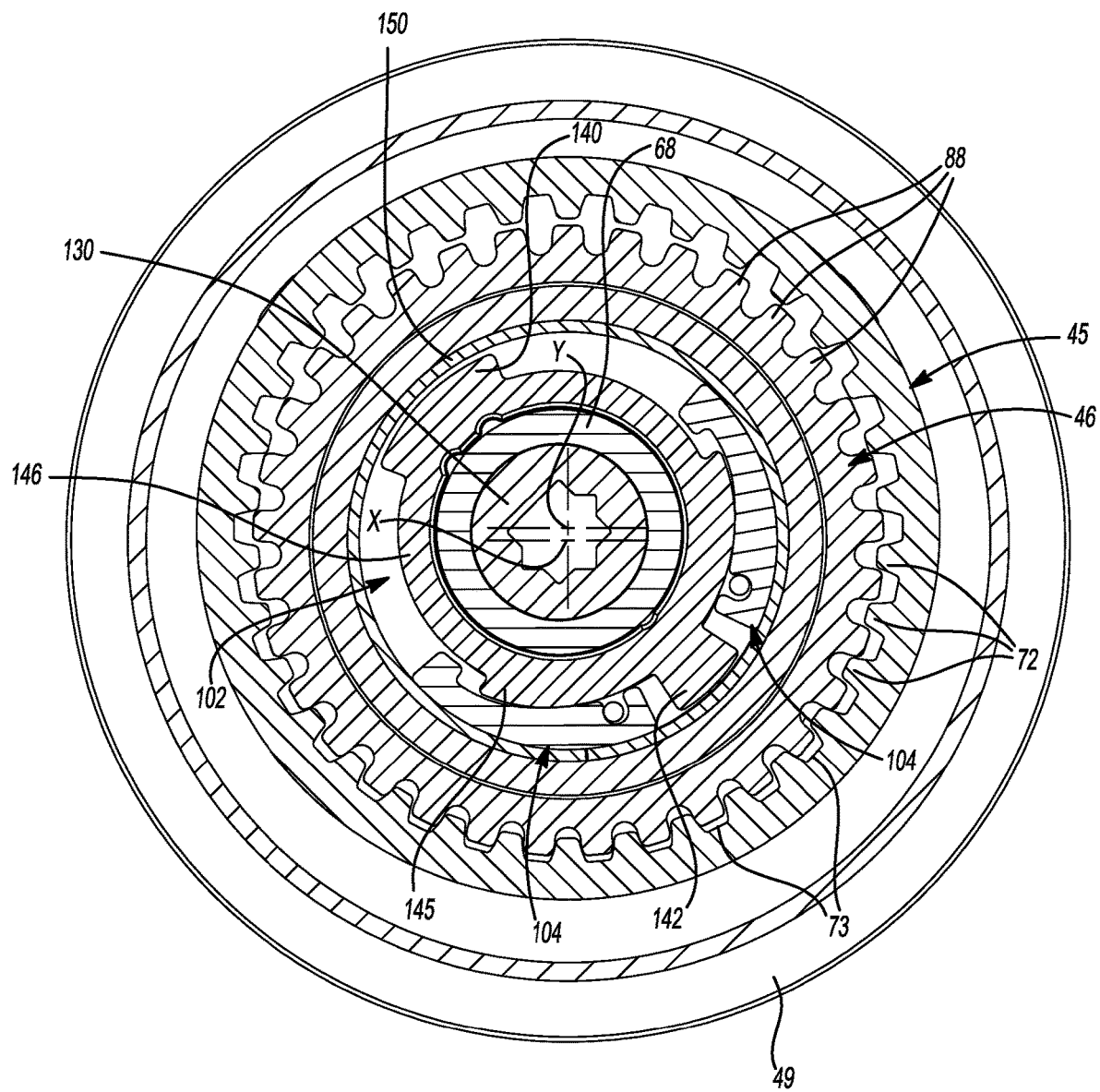
FIG. 13 is cross-sectional view of the recliner assembly taken along line 13-13 of FIG. 12.

As shown in FIGS. 8 and 13, wedges 104 are disposed between the body 138 and a bushing ring 150. Each wedge 104 has a first end that extends into a respective third aperture 134 of the pivot plate 100. Each wedge 104 also has a groove 155 that receives a respective end 152 of a spring 153 such that the spring 153 forces the wedges 104 outwardly and away from the distal portion 142. In this way, the wedges 104 are wedged between the first portion 145 of the body 138 and the busing ring 150 and rotation of the pivot plate 100 and the second cam 102 causes rotation of the wedges 104.

The encapsulating ring 49 may be attached (e.g., by laser welding) to the first locking plate 44 and the housing plate 22 to hold the recliner heart 24 together and also to cover a periphery of the recliner heart 24, thereby preventing debris and fluid from infiltrating and damaging the recliner heart 24.

The unlock lever 30 may engage the cable 18 and the shaft portion 110 of the first cam 96. Rotation of the unlock lever 30 may rotate the first cam 96 to move the pawls 98 between the secure position and the release position without corresponding rotation of the pivot plate 100 and the second cam 102. The unlock lever 30 includes a shaft portion 154 and a lever portion 156. The shaft portion 154 may extend at least partially through an opening 158 of the first cam 96. The unlock lever 30 may be rotatable relative to the housing plate 22 about a longitudinal axis of the shaft portion 154.

With reference to FIGS. 3 and 4, the lever portion 156 may extend radially outward from the shaft portion 154 and include a radially outer end 160 having an aperture 162. A first end 164 of the cable 18 may include a perpendicularly extending engaging member 166 that is securely received in the aperture 162 of the outer end 160 causing the cable 18 and the unlock lever 30 to be engaged.

The actuation assembly 20 may be mounted on the seatback 11 (e.g., at or near an upper end of the seatback) and may be engaged to a second end 168 of the cable 18 (FIGS. 1 and 2). In this way, the actuation assembly 20 may be operably connected to the unlock lever 30 and include an actuation lever 170 and a spring 172. The actuation lever 170 may be movable between a lock state and an unlock state which causes corresponding rotation of the unlock lever 30 and the first cam 96. The spring 172 may bias the actuation lever 170 toward the lock state.

With reference to FIGS. 1-13, operation of the seat adjustment mechanism 14 will be described in detail. When a passenger (not shown) ingress into or egress out of a space (e.g., a rear seating row) behind the vehicle seat assembly 10, the passenger may facilitate entry into or departure out of the space by either the actuation lever 170 or an actuation switch 173.

Movement of the actuation lever 170 from the lock state to the unlock state causes rotation of the unlock lever 30 connected thereto via the cable 18. Rotation of the unlock lever 30 rotates the first cam 96 in a way that causes the pawls 98 to slide to the release position (i.e., the locking members 122 of the pawls 98 are disengaged from the notches 94 of the third locking plate 46) without causing corresponding rotation of the pivot plate 100 and the second cam 102. The seatback 11 may then be rotated in Direction B (FIG. 1), which causes rotation of the second and third locking plates 45, 46, the pivot plate 100 and the second cam 102 relative to the first locking plate 44 and the first cam 96.

When the pawls 98 are in the secure position (i.e., the locking members 122 of the pawls 98 are engaged with the notches 94 of the third locking plate 46), actuation of the actuation switch 173 causes a motor 174 to drive the cross bar 135. This causes the pivot plate 100, the second cam 102 and the wedges 104 to rotate without corresponding rotation of the first cam 96 and the first and third locking plates 44, 46. Rotation of the pivot plate 100, the second cam 102 and the wedges 104 causes rotation of the second locking plate 45 relative to the first cam 96 and the first and third locking plates 44, 46. That is, a center point X of the third locking plate 46 and a center point Y of the second locking plate 45 are offset (FIG. 13) such that rotation of pivot plate 100, the second cam 102 and the wedges 104 causes the second locking plate 45 to rotate about the center point X of the third locking plate 46. In this way, a portion of the teeth 72 of the second locking plate 45 are meshingly engaged with a portion of the teeth 88 of the third locking plate 46 at different points in the rotational path as the second locking plate 45 rotates about the center point X of the third locking plate 46 (i.e., all the teeth 72 of the second locking plate 45 are never meshingly engaged with all the teeth 88 of the third locking plate 46), thereby rotating the seatback 11 in Direction B (or Direction A).

With reference to FIGS. 14-26, another seat adjustment mechanism 214 is provided. The structure and function of the seat adjustment mechanism 214 may be similar or identical to the seat adjustment mechanism 14 described above, apart from any exceptions described below.

Figure 14:
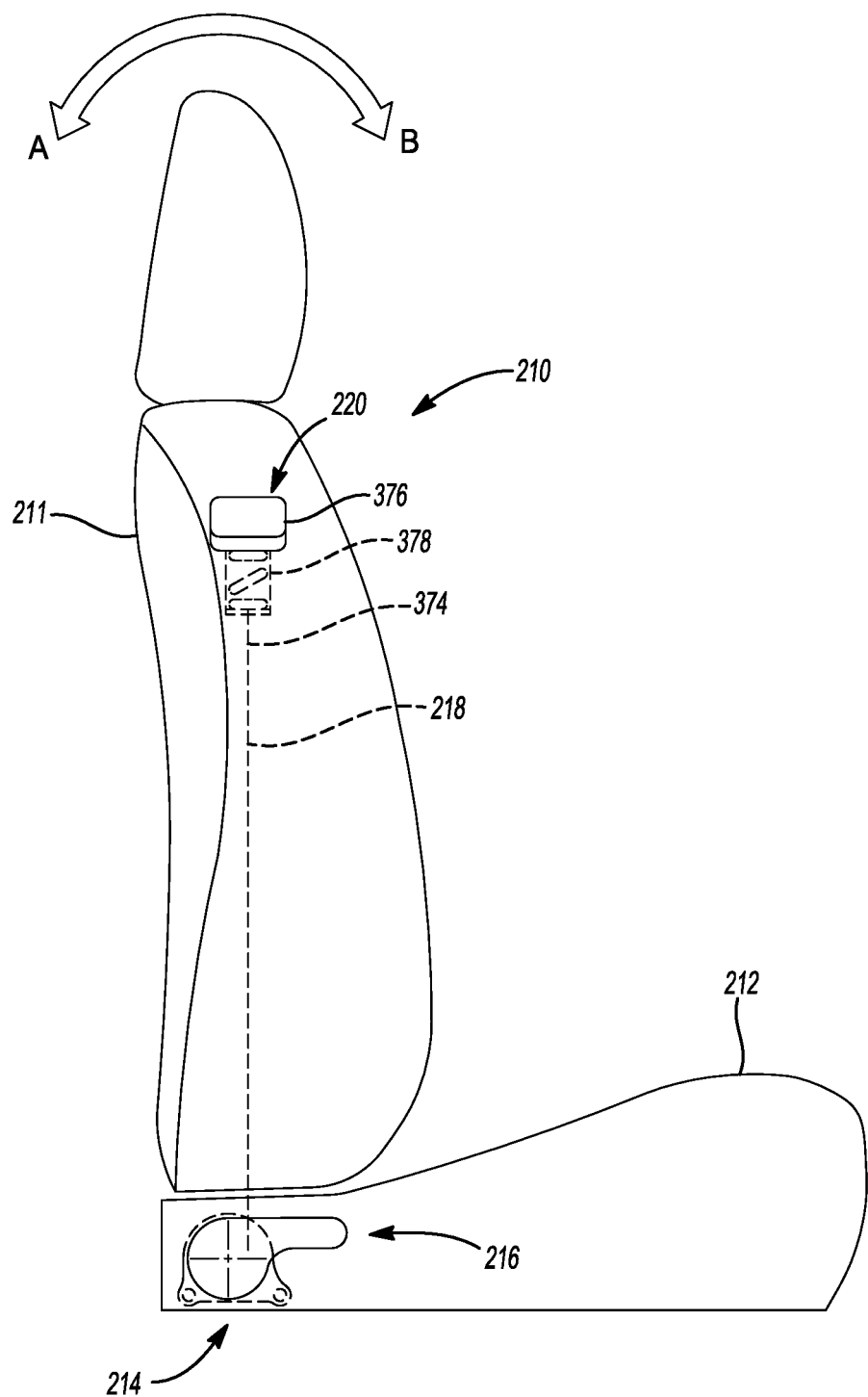
FIG. 14 is a side view of another vehicle seat assembly in an upright position according to the principles of the present disclosure.
Figure 15:
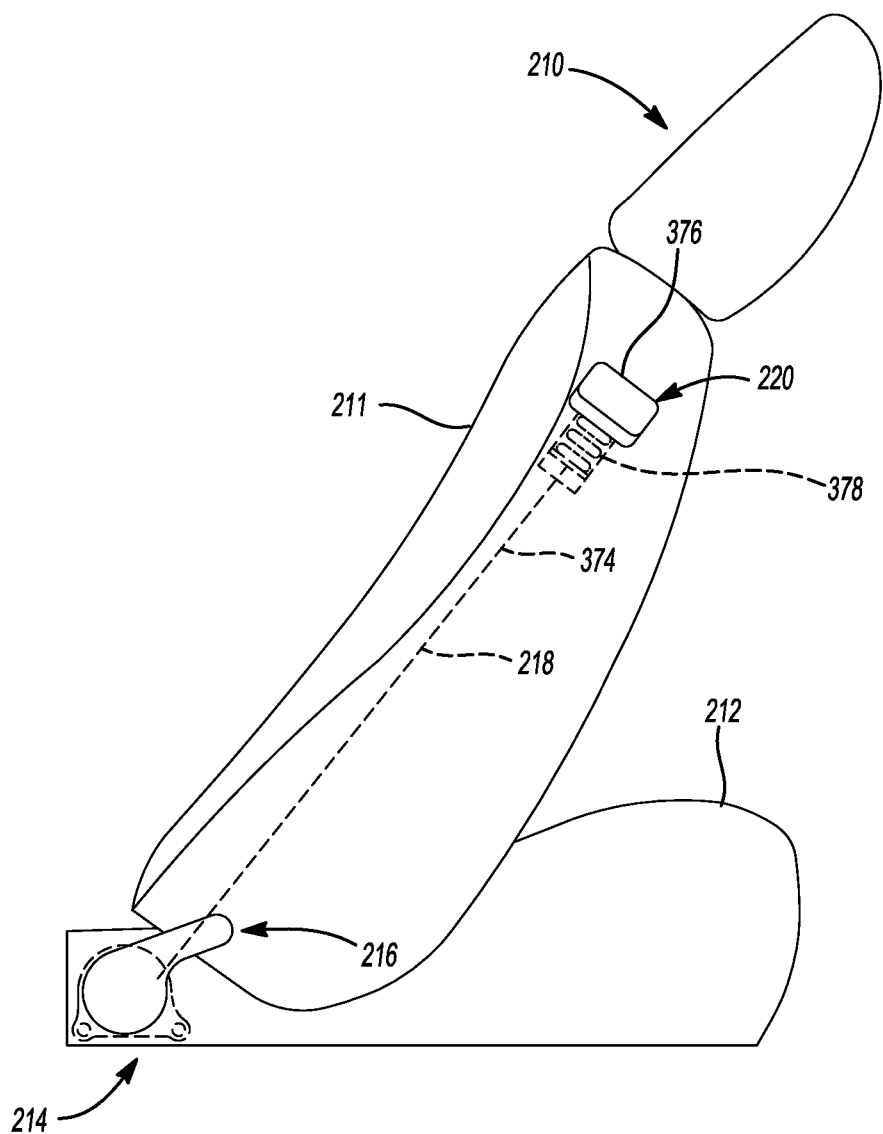
FIG. 15 is a side view of the vehicle seat assembly of FIG. 14 with a seatback in a forward dump position.

With reference to FIGS. 14 and 15, a vehicle seat assembly 210 is shown. The vehicle seat assembly 210 may be positioned within a vehicle (not shown) and may include a seatback 211 attached to a seat bottom 212. The seat adjustment mechanism 214 may be operatively attached to the vehicle seat assembly 210 and may include a recliner assembly 216, a cable 218, and an actuation assembly 220. The recliner assembly 216 may be connected to the actuation assembly 220 via the cable 218 and/or one or more links (not shown). The recliner assembly 216 may also be attached to the seatback 211 and the seat bottom 212 of the vehicle seat assembly 210. The recliner assembly 216 may be operable in a locked state preventing relative rotation between the seatback 211 and the seat bottom 212 and an unlocked state permitting relative rotation between the seatback 211 and the seat bottom 212 among an upright position (FIG. 14), a rearward reclined position (not shown) and a forward dump position (FIG. 15).

Figure 16:
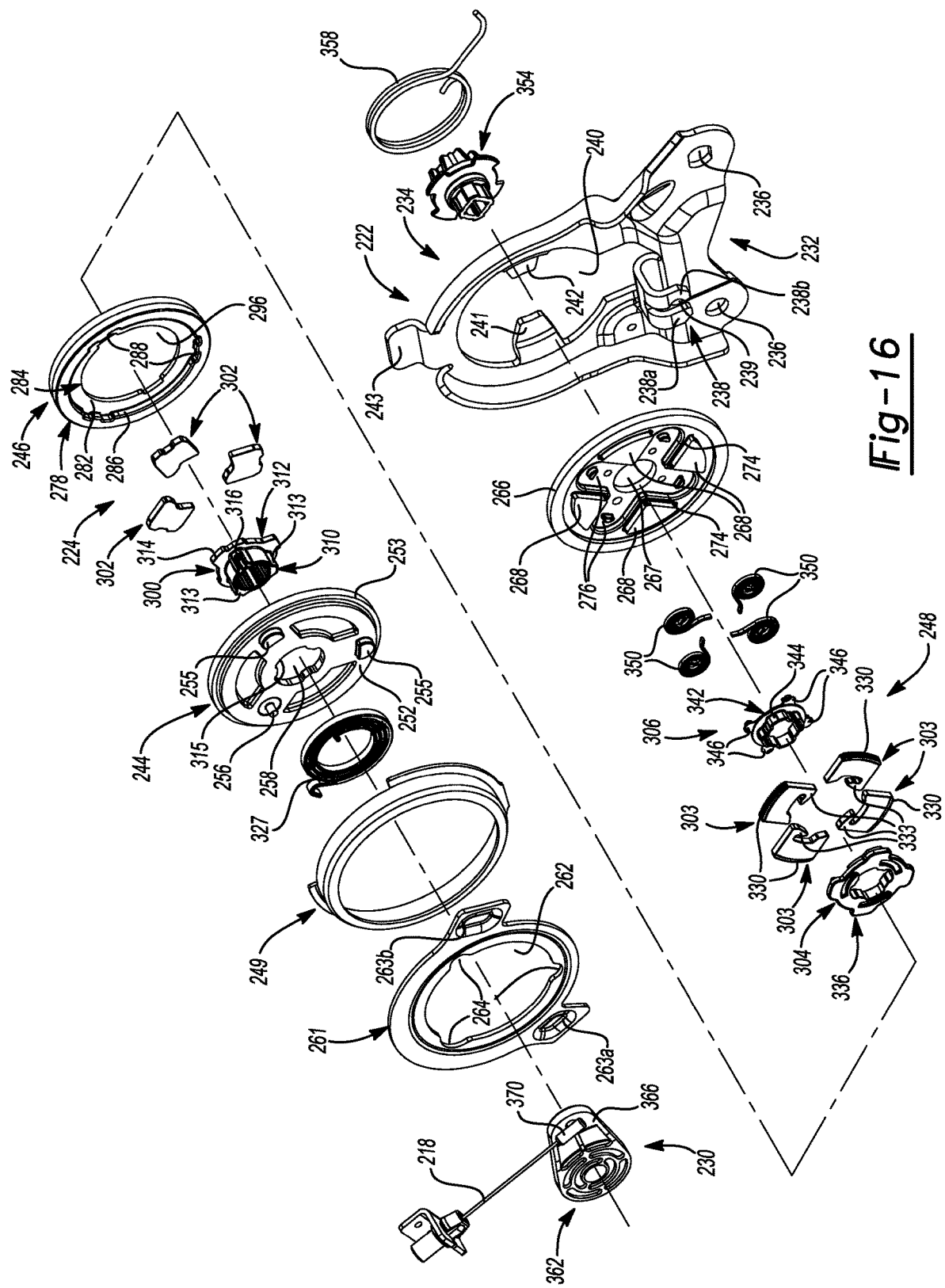
FIG. 16 is an exploded perspective view of a recliner assembly of a seat adjustment mechanism of FIG. 14.
Figure 17:
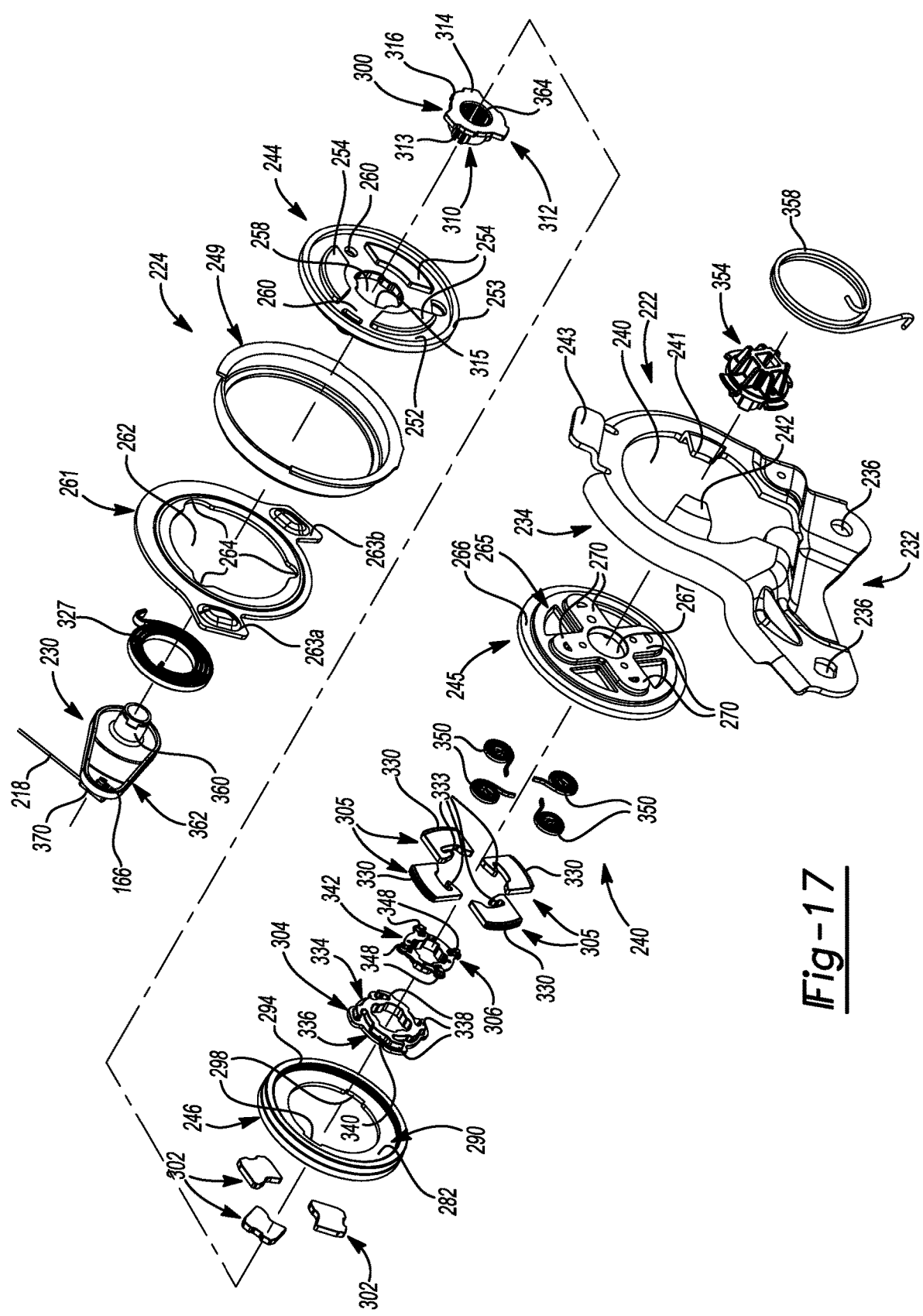
FIG. 17 is another exploded perspective view of the recliner assembly of the seat adjustment mechanism of FIG. 14.
Figure 18:
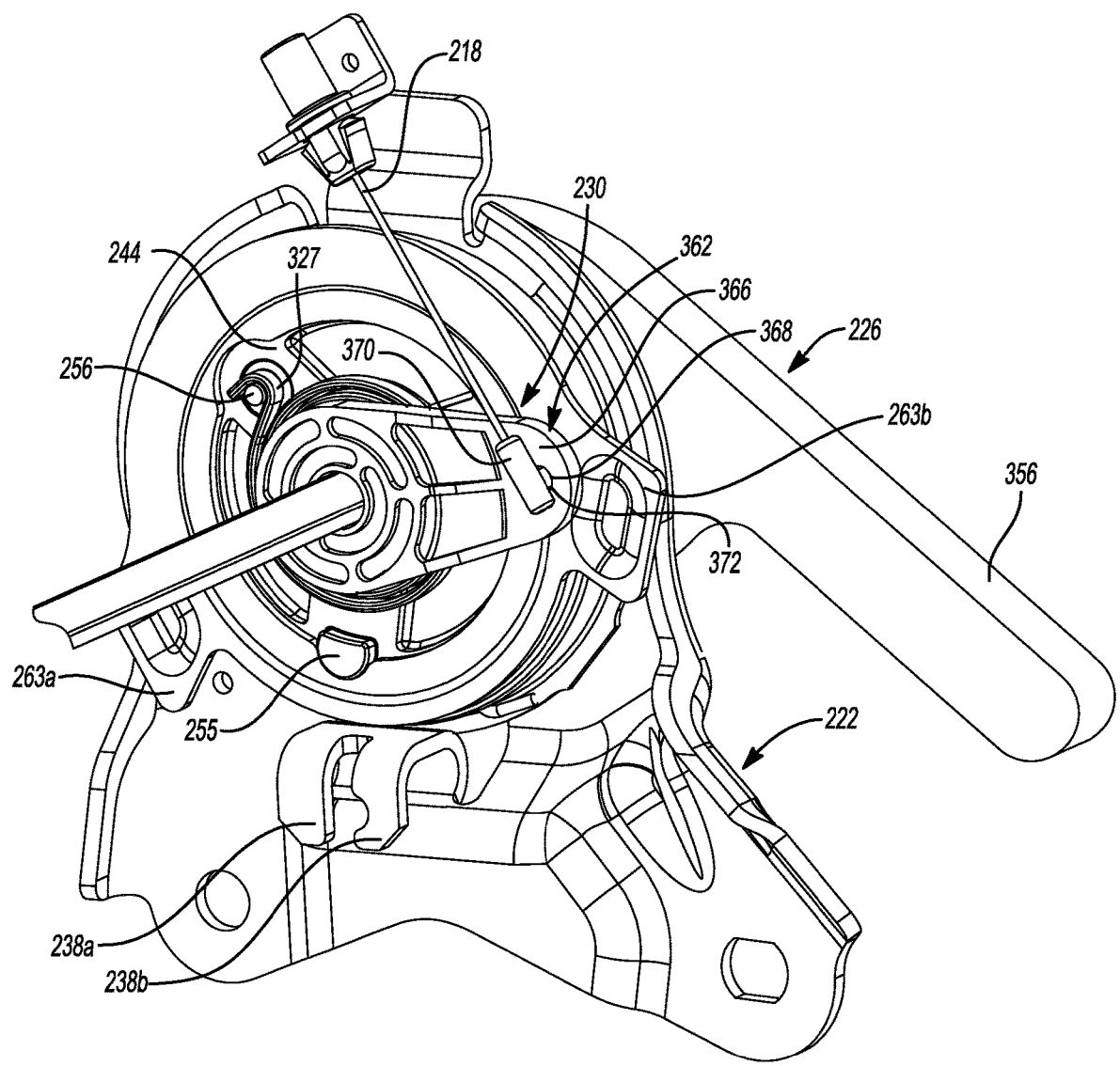
FIG. 18 is a perspective view of the recliner assembly with a recliner heart in a locked state.

With reference to FIGS. 16-26, the recliner assembly 216 may include a housing plate 222, a recliner heart 224 (FIGS. 16 and 17), a recliner handle assembly 226 and an unlock lever 230. The housing plate 222 may be attached to the seat bottom 212 of the vehicle seat assembly 210. As shown in FIGS. 16 and 17, the housing plate 222 may include a first portion 232 and a second portion 234. The first portion 232 may include a plurality of apertures 236 and a tab 238 (FIG. 16). Fasteners (not shown) may extend through the plurality of apertures 236 to securely attach the housing plate 222 to the seat bottom 212. The tab 238 includes a first member 238a and a second member 238b that may limit or restrict the rotation of the seatback 211 in the rearward recline position and the forward dump position. The tab 238 may also define a slot 239 between the first member 238a and the second member 238b for mounting a spring (not shown) that provides a torque to return the seatback 211 from the rearward recline position (not shown) to the upright position (FIG. 1). The second portion 234 may be substantially circular and define an opening 240 in a central portion thereof. As shown in FIGS. 16 and 17, the second portion 234 may include first and second flanges 241, 242 and a tab 243. The first and second flanges 241, 242 may extend perpendicularly from a periphery of the opening 240 toward each other. The tab 243 may be positioned above the opening 240 and extend outwardly from a periphery of the second portion 234.

The recliner heart 224 may be mounted to the housing plate 222 and may selectively permit relative rotation between the seatback 211 and the seat bottom 212. The recliner heart 224 may be a round recliner heart, for example, or any other suitable type of recliner heart. The recliner heart 224 may include a first locking plate 244, a second locking plate 245 a third locking plate 246, a locking assembly 248 and an encapsulating ring 249.

As shown in FIGS. 16 and 17, the first locking plate 244 may include a generally circular shape having a main body 252 and a rim 253. The main body 252 may include a plurality of first protrusions 254, a plurality of second protrusions 255, a spring post 256, and a central aperture 258 formed therethrough. The first protrusions 254 may extend from the main body 252 and are generally arcuate in shape. The first protrusions 254 may cooperate to form a plurality of guide recesses 260 that support at least a portion of the locking assembly 248. The plurality of second protrusions 255 may extend from the main body 252 opposite the direction of the first protrusions 254. The spring post 256 may also extend from the main body 252 opposite the direction of the first protrusions 254. The rim 253 may extend 360 degrees around a periphery of the main body 252.

An attachment plate 261 may be attached (e.g., laser welded) to and between the seat back frame (not shown) and the first locking plate 244 such that the attachment plate 261 is operatively connected with the seatback 211. In this way, rotation of the seatback 211 causes corresponding rotation of the attachment plate 261 and the first locking plate 244. As shown in FIGS. 16 and 17, the attachment plate 261 may include an opening 262 extending through a center portion thereof and a pair of wings 263a, 263b protruding from a periphery of the attachment plate 261. The opening 262 may have grooves 264 formed at a periphery thereof. At least two grooves 264 may receive respective second protrusions 255 of the first locking plate 244 once the attachment plate 261 is attached to the first locking plate 244. The wing 263a contacts the first member 238a of the tab 238 when the seatback 211 is in the rearward recline position to limit further rotation of the seatback 211 in the rearward recline position and the wing 263b contacts the second member 238b of the tab 238 when the seatback 211 is in the forward dump positon to further limit rotation of the seatback 211 in the forward dump position.

Figure 20:
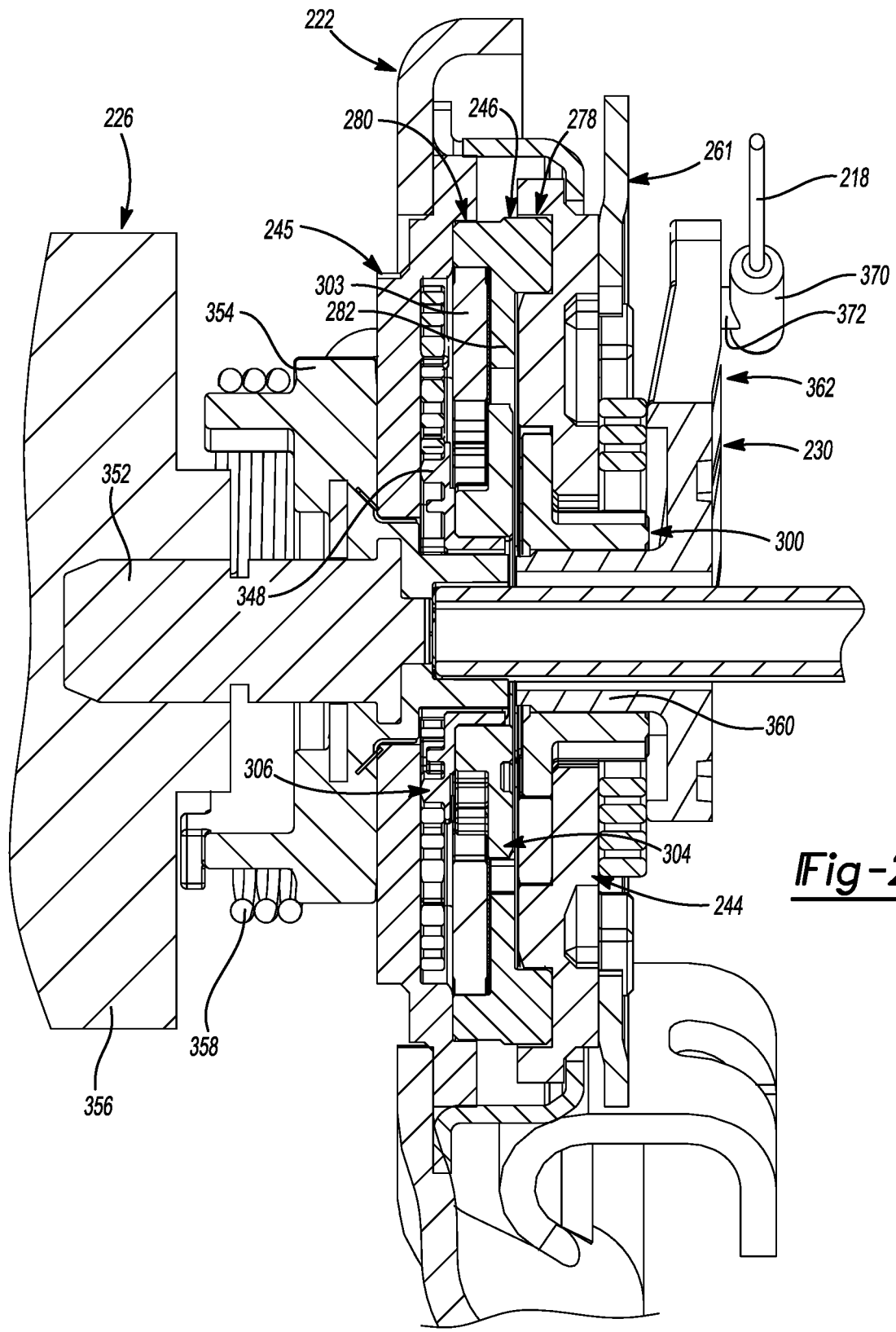
FIG. 20 is another cross-sectional view of the recliner assembly of FIG. 18.
Figure 21:
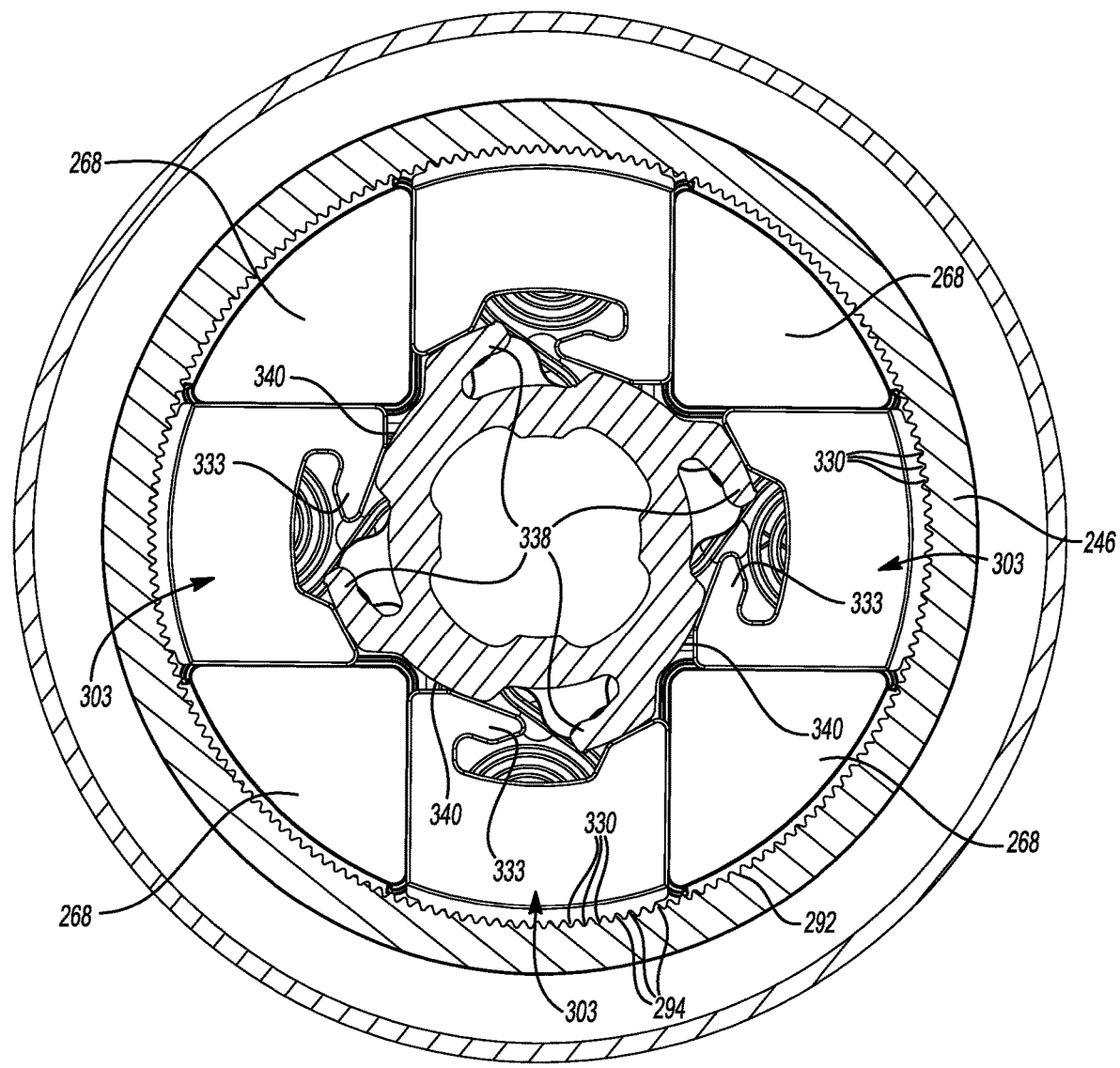
FIG. 21 is another cross-sectional view of the recliner assembly of FIG. 18.
Figure 22:
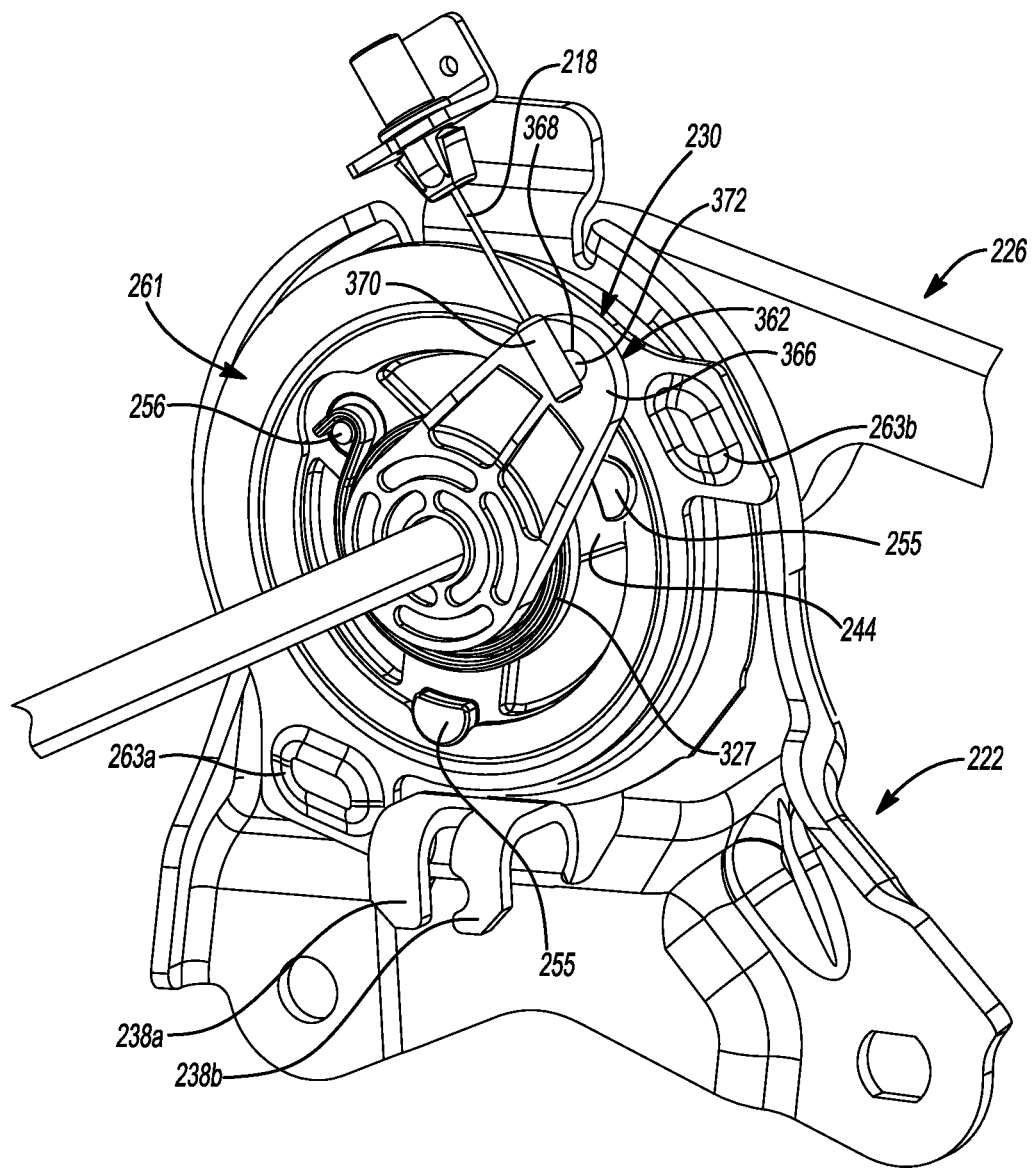
FIG. 22 is a perspective view of the recliner assembly with the recliner heart in an unlocked and forward dump position.
Figure 26:
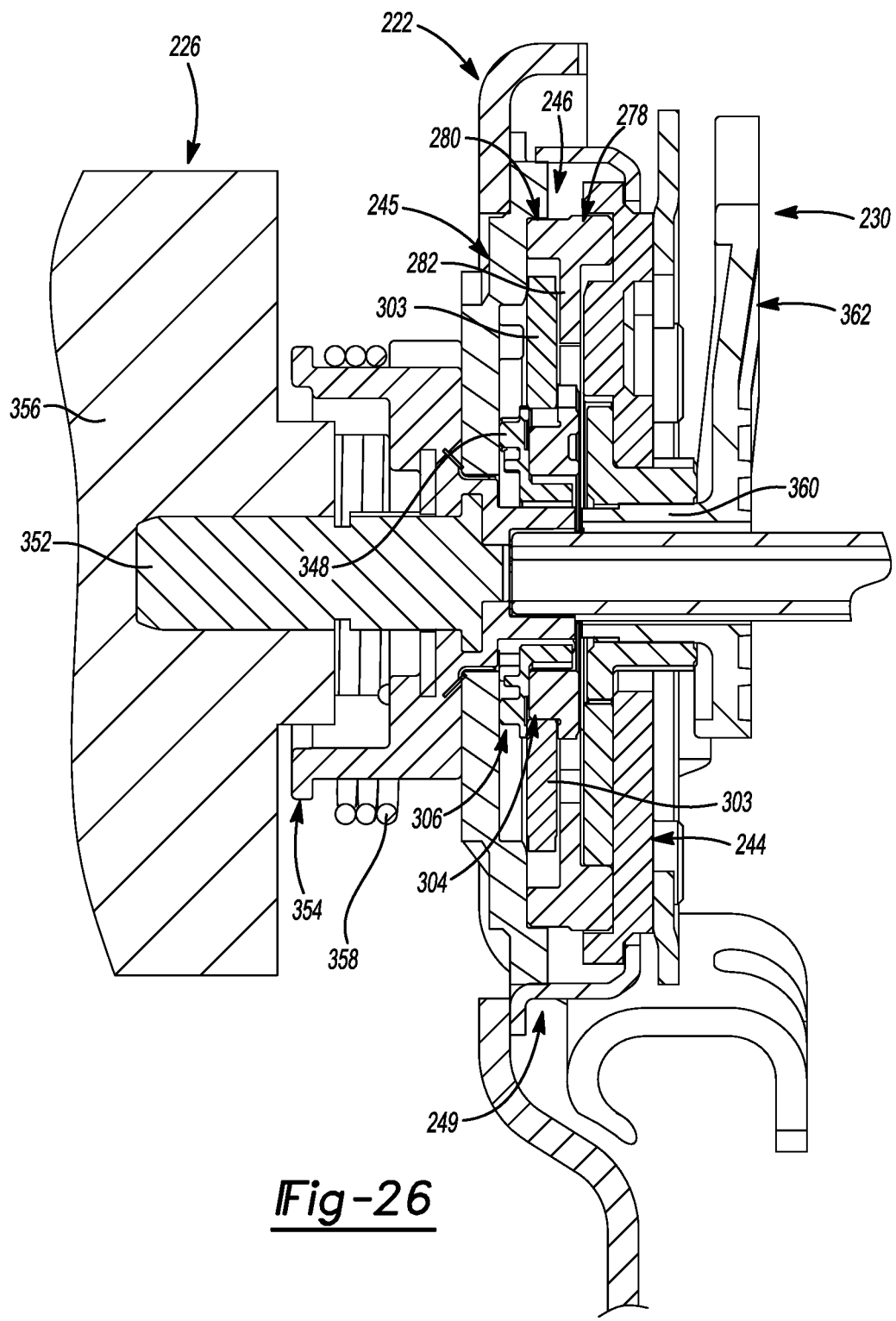
FIG. 26 is another cross-sectional view of the recliner assembly of FIG. 24.

The second locking plate 245 may be rotationally fixed relative to the seat bottom 212 and may be attached (e.g., laser welded) to the housing plate 222 and the encapsulating ring 249 (FIGS. 20 and 26). The second locking plate 245 may include a generally circular shape and may include a plate surface 265 and a rim 266. The plate surface 265 may include an aperture 267, a plurality of first projections 268 and a plurality of second projections 270. As shown in FIGS. 16 and 17, the aperture 267 may extend through a center portion of the plate surface 265. The first projections 268 may be disposed radially around the aperture 267 and may extend from the plate surface 265, thereby defining first recesses 274. The second projections 270 may extend from the plate surface 265 opposite the direction of the first projections 268, thereby forming second recesses 276. The first recesses 274 and the second recesses 276 are adjacent to each other. The rim 266 may extend 360 degrees around a periphery of the plate surface 265 and may be attached (e.g., laser welded) to the housing plate 222 and the encapsulating ring 249.

The third locking plate 246 may include a generally circular shape and may be disposed between the first and second locking plates 244, 245. The third locking plate 246 may include a first section 278 (FIG. 16), a second section 280 (FIG. 17) and a partition 282. The first section 278 may define an opening 284 and may include an inner surface 286 having notches 288 formed therein. The second section 280 may define an opening 290 and may include an inner surface 292 having teeth 294 formed thereon. The opening 290 includes a diameter that is larger than a diameter of the opening 284. The teeth 294 may extend 360 degrees around the inner diametrical surface 292. The partition 282 may be circular-shaped and may be disposed between the first section 278 and the second section 280. The partition 282 may extend radially inwardly and may define an opening 296 that has a diameter that is smaller than the diameters of the openings 284, 290. The opening 296 may have a rectangular-shaped groove 298 formed at a periphery thereof.

Figure 19:
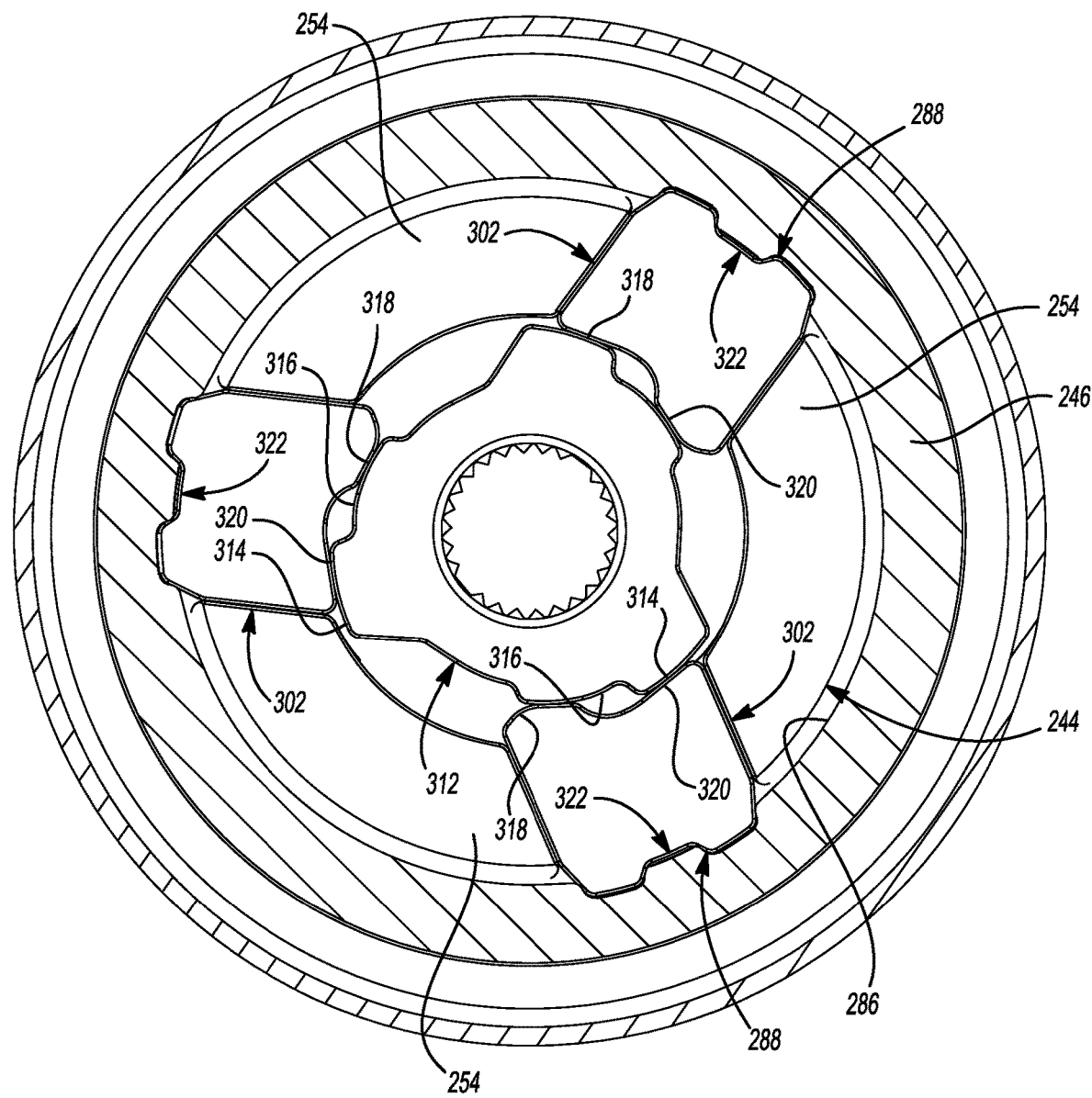
FIG. 19 is a cross-sectional view of the recliner assembly of FIG. 18.
Figure 23:
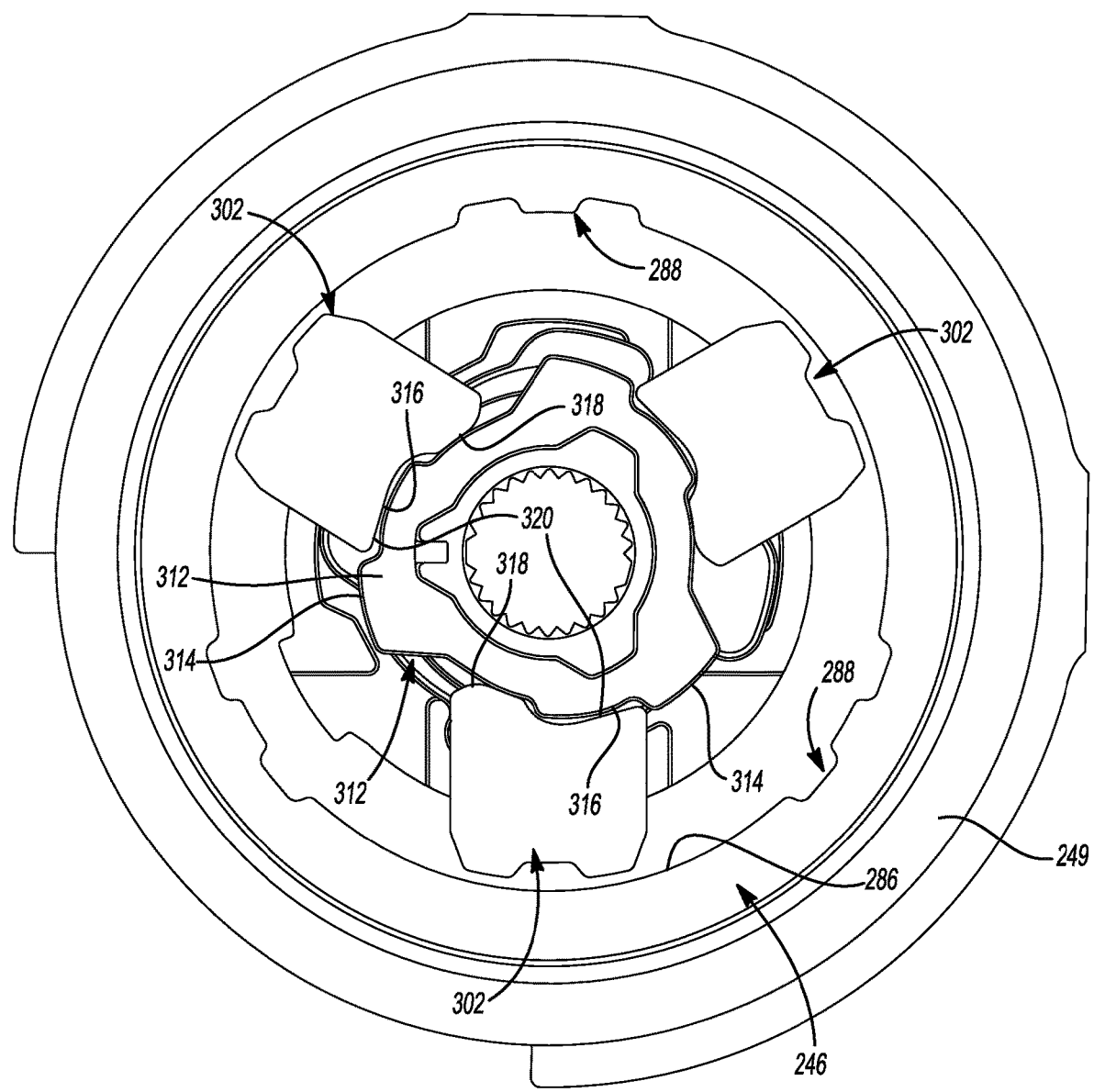
FIG. 23 is a cross-sectional view of the recliner assembly of FIG. 22.
Figure 24:
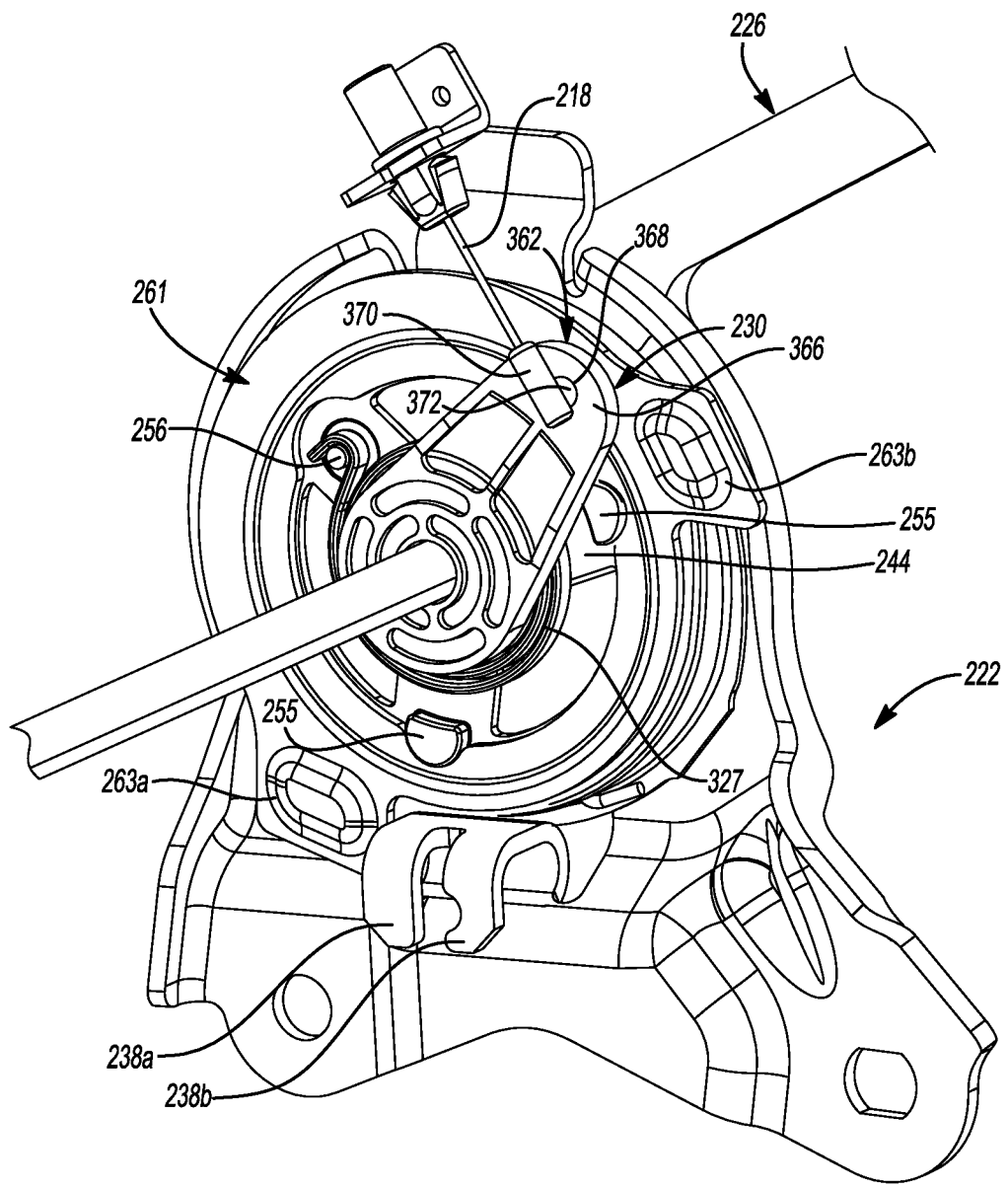
FIG. 24 is a perspective view of the recliner assembly with the recliner heart is an unlocked and forward dump position.

The locking assembly 248 may include a first cam 300, first and second pawls 302, 303, an actuator 304 and a second cam 306. The first cam 300 may extend through the aperture 258 of the first locking plate 244 (FIGS. 20 and 26) and may engage the unlock lever 230. The first cam 300 may include a shaft portion 310 and a disk portion 312. The shaft portion 310 may engage the unlock lever 230 such that actuation of the actuation assembly 220 rotates the unlock lever 230 and the first cam 300. The shaft portion 310 may include radially extending projections 313 that extend through grooves 315 at a periphery of the aperture 258 of the first locking plate 244. The disk portion 312 may include a plurality of first cam lobes 314 and a plurality of second cam lobes 316 that may selectively engage the first pawls 302 (FIGS. 19 and 23).

The first pawls 302 may be radially disposed around the central aperture 258 of the first locking plate 244 with each first pawl 302 slidably mounted in a corresponding guide recess 260 between a secure position and a release position. Each first pawl 302 may include a pair of engagement members 318, 320 and a locking member 322 formed generally on an opposite end of the first pawls 302 relative to the engagement members 318, 320.

A coiled spring 327 may be attached to the spring post 256 at one end and attached to the shaft portion 310 at another end such that the unlock lever 230 is rotationally biased toward a locked position. The coiled spring 327 may also engage the shaft portion 310 such that the first cam 300 is rotationally biased in a manner that causes the engagement members 318 to force the first pawls 302 outwardly to the secure position.

The second pawls 303 may be radially disposed around the aperture 267 of the second locking plate 245 with each second pawl 303 slidably mounted in a corresponding first recess 274 defined by two of the first projections 268 between a secure state and a release state. As shown in FIGS. 16 and 17, an edge of each second pawl 303 may include teeth 330 adapted for meshing engagement with the teeth 294 of the third locking plate 246. The edge may include a generally arcuate shape to improve engagement between the second pawls 303 and the teeth 294 of the third locking plate 246 when the second pawls 303 are in the secure state. A portion of each second pawl 303 may include a latch 333.

Figure 25:
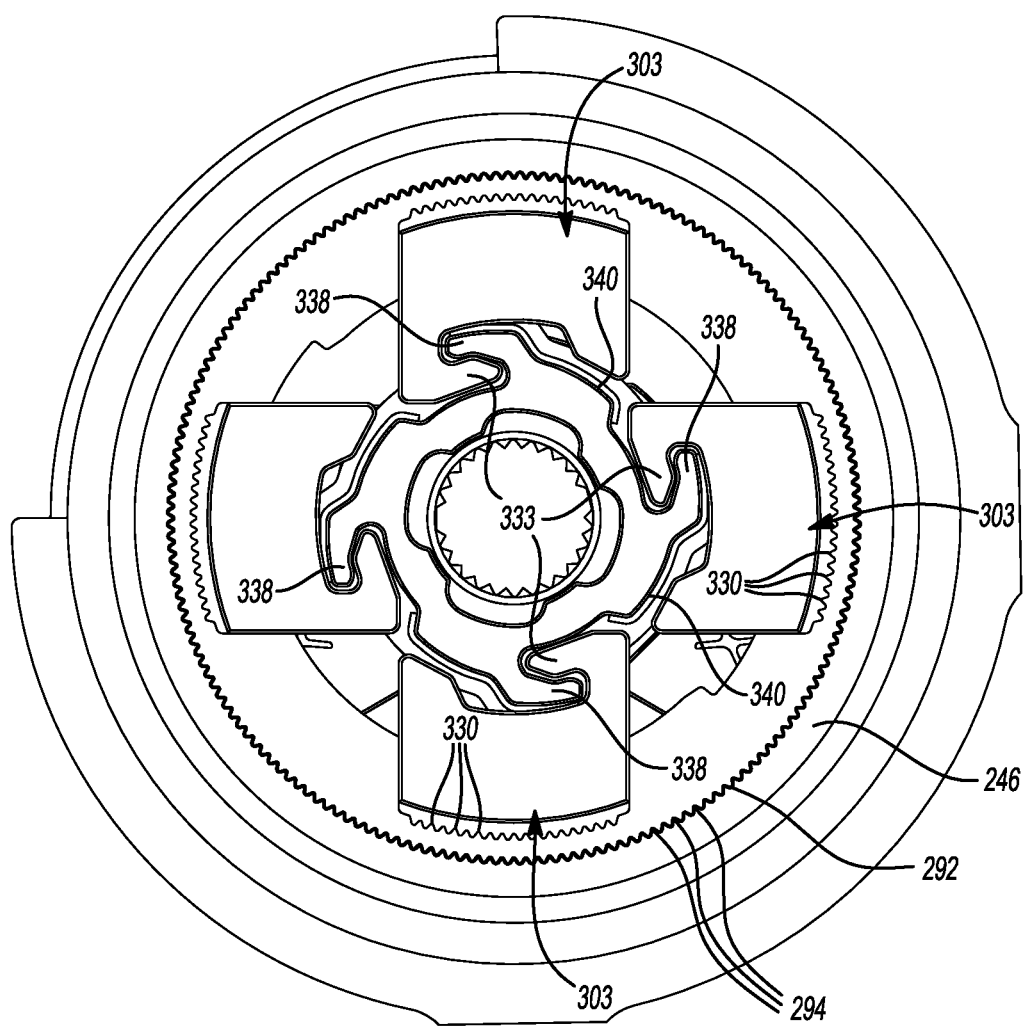
FIG. 25 is another cross-sectional view of the recliner assembly of FIG. 24.

The actuator 304 may be engaged with the second cam 306. As shown in FIGS. 16 and 17, the actuator 304 may include a bushing portion 334 and a generally round disk portion 336. The bushing portion 334 may include a plurality of radial latches 338 and a plurality of lobes 340. The radial latches 338 may selectively engage the latches 333 of the second pawls 303 to move the second pawls 303 into the release state (FIG. 25).

The second cam 306 may be engaged with the actuator 304 and the recliner handle assembly 226. As shown in FIGS. 16 and 17, the second cam 306 may include a disk portion 342 and an extrusion 344 extending perpendicularly from the disk portion 342. The disk portion 342 may have a plurality of flanges 346 extending therefrom. Each flange 346 may include a circular projection 348 extending therefrom that is engaged to a corresponding coiled spring 350 disposed in the second recess 276. Because each projection 348 is engaged to the corresponding coiled spring 350, the second cam 306 rotationally biases the actuator 304 in a manner that causes the lobes 340 to force the second pawls 303 outwardly into the secure state (i.e., engaging the teeth 294 of the third locking plate 246).

The encapsulating ring 249 may be attached (e.g., by laser welding) to the first locking plate 244 and the housing plate 222 to hold the recliner heart 224 together and also to cover a periphery of the recliner heart 224, thereby preventing debris and fluid from infiltrating and damaging the recliner heart 224.

As shown in FIGS. 20 and 26, the recliner handle assembly 226 may include a first connecting member 352, a second connecting member or hub 354 and a recliner handle 356. The first connecting member 352 may be attached to the recliner handle 356 and the second connecting member 354. The second connecting member 354 may be attached to the second cam 306 and the first connecting member 354. In this way, the recliner handle 356 may be rotatable between a locked position in which the second pawls 303 are in the secure state and an unlocked position in which the second pawls 303 are in the release state. The recliner handle 356 may permit rotation of the seatback 211 in Direction A (or Direction B) once the recliner handle 356 is in the unlocked position and the second pawls 303 are in the release state. A spring 358 is engaged with the second connecting member 354 to bias the recliner handle 356 toward the locked position.

The unlock lever 230 may engage the cable 218 and the shaft portion 310 of the first cam 300. Rotation of the unlock lever 230 may rotate the first cam 300 to move the first pawls 302 between the secure position and the release position without corresponding rotation of the actuator 304, the second cam 306 and the recliner handle assembly 226. The unlock lever 230 includes a shaft portion 360 and a lever portion 362. The shaft portion 360 may extend at least partially through an opening 364 of the first cam 300. The unlock lever 230 may be rotatable relative to the housing plate 222 about a longitudinal axis of the shaft portion 360.

The lever portion 362 may extend radially outward from the shaft portion 360 and include a radially outer end 366 having an aperture 368. A first end 370 of the cable 218 may include a perpendicularly extending engaging member 372 that is securely received in the aperture 368 of the outer end 366 causing the cable 218 and the unlock lever to be engaged.

The actuation assembly 220 may be mounted on the seatback 211 (e.g., at or near an upper end of the seatback) and may be engaged to a second end 374 of the cable 218 (FIGS. 1 and 2). In this way, the actuation assembly 220 may be operably connected to the unlock lever 230 and include an actuation lever 376 and a spring 378. The actuation lever 376 may be movable between a lock state and an unlock state which causes corresponding rotation of the unlock lever 230 and the first cam 300. The spring 378 may bias the actuation lever 376 toward the lock state.

With reference to FIGS. 14-26, operation of the seat adjustment mechanism 214 will be described in detail. When a passenger (not shown) ingress into or egress out of a space (e.g., a rear seating row) behind the vehicle seat assembly 210, the passenger may facilitate entry into or departure out of the space by either the actuation lever 376 or the recliner handle 356.

Movement of the actuation lever 376 from the lock state to the unlock state causes rotation of the unlock lever 230 connected thereto via the cable 218. Rotation of the unlock lever 230 rotates the first cam 300 in a way that causes the first pawls 302 to slide to the release position (i.e., the locking members 322 of the first pawls 302 are disengaged from the notches 288 of the third locking plate 246) without causing corresponding rotation of the actuator 304, the second cam 306 and the recliner handle assembly 226. In this way, rotation of the seatback 211 in Direction B causes rotation of the first locking plate 244 relative to the second and third locking plates 245, 246, the actuator 304, the second cam 306 and the recliner handle assembly 226. Stated another way, when the first pawls 302 are disengaged from the third locking plate 246 and the second pawls 303 are engaged with the third locking plate 246, rotation of the seatback 211 causes the first locking plate 244 to rotate relative to the second and third locking plates 245, 246, the actuator 304, the second cam 306 and the recliner handle assembly 226.

Rotation of the recliner handle 356 from the locked position to the unlocked position causes rotation of the second cam 306. Rotation of the second cam 306 rotates the actuator 304 in way that causes the latches 338 to move the second pawls 303 inwardly. This causes the teeth 330 to disengage from the teeth 294 of the third locking plate 246 without causing corresponding rotation of the first cam 300. In this way, rotation of the seatback 211 causes rotation of the first and third locking plates 244, 246, the first cam 300 and the unlock lever 230 relative to the second locking plate 245, the actuator 304 and the second cam 306. Stated another way, when the first pawls 302 are engaged with the third locking plate 246 (i.e., rotationally fixing the third locking plate 246 and the first locking plate 244) and the second pawls 303 are disengaged from the third locking plate 246, rotation of the seatback 211 causes the first and third locking plates 244, 246, the first cam 300, the unlock lever 230 and the spring 327 to rotate relative to the second locking plate 245, the actuator 304 and the second cam 306.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A recliner heart comprising:
a first locking plate defining a plurality of recesses;
a second locking plate including a first inner diametrical surface having first teeth formed thereon;
a third locking plate disposed between the first and second locking plates and including a second inner diametrical surface and an outer diametrical surface, the second inner diametrical surface having a plurality of notches formed therein, the outer diametrical surface having second teeth formed thereon, some of the second teeth are meshingly engaged with some of the first teeth; and
a plurality of pawls slidably disposed in the recesses and movable within the recesses between a secure position in which the pawls are engaged with the notches of the third locking plate and a release position in which the pawls are disengaged from the notches of the third locking plate,
wherein the pawls include locking protrusions that selectively engage corresponding ones of the notches, and wherein a total number of locking protrusions of all of the pawls is equal to a total number of notches formed in the third locking plate.

2. The recliner heart of claim 1, wherein the third locking plate includes a first section and a second section, and wherein the first section includes the second inner diametrical surface having the notches formed therein and the second section includes the outer diametrical surface having the second teeth formed thereon.

3. The recliner heart of claim 2, wherein the first section defines a first opening and the second section defines a second opening, and wherein the first opening has a diameter that is larger than a diameter of the second opening.

4. The recliner heart of claim 1, wherein the first locking plate includes a plurality of protrusions, and wherein each of the recesses is defined by adjacent ones of the protrusions.

5. The recliner heart of claim 4, further comprising a first cam engaging the pawls and causing the pawls to slide to the secure position, wherein the first cam extends through the first locking plate.

6. The recliner heart of claim 5, wherein a spring engages the first cam and biases the pawls to the secure position.

7. The recliner heart of claim 5, further comprising a pivot plate extending through the second locking plate.

8. The recliner heart of claim 7, further comprising a second cam rotationally fixed to the pivot plate,
wherein the second and third locking plates, the pivot plate and the second cam are permitted to rotate without corresponding rotation of the first cam and the first locking plate when the pawls are disengaged from the notches of the third locking plate,
wherein the second locking plate, the pivot plate and the second cam are permitted to rotate without corresponding rotation of the first cam and the first and third locking plates when the pawls are engaged with the notches of the third locking plate, and
wherein a center point of the third locking plate is offset from a center point of the second locking plate.

9. The recliner heart of claim 1, wherein each of the pawls includes only two locking protrusions.

10. A recliner heart comprising:
a first locking plate including a plurality of protrusions and a recess defined between the protrusions;
a second locking plate including a first inner diametrical surface having first teeth formed thereon;
a third locking plate disposed between the first and second locking plates and including a second inner diametrical surface and an outer diametrical surface, the second inner diametrical surface having a notch formed therein, the outer diametrical surface having second teeth formed thereon, some of the second teeth are meshingly engaged with some of the first teeth;
a pawl slidably disposed in the recess and movable within the recess between a secure position in which the pawl is engaged with the notch of the third locking plate and a release position in which the pawl is disengaged from the notch of the third locking plate;
a first cam engaging the pawl and causing the pawl to slide to the secure position, wherein the first cam extends through the first locking plate;
a pivot plate extending through the second locking plate; and
a second cam rotationally fixed to the pivot plate.

11. The recliner heart of claim 10, wherein the second and third locking plates, the pivot plate and the second cam are permitted to rotate without corresponding rotation of the first cam and the first locking plate when the pawl is disengaged from the notch of the third locking plate.

12. The recliner heart of claim 11, wherein the second locking plate, the pivot plate and the second cam are permitted to rotate without corresponding rotation of the first cam and the first and third locking plates when the pawl is engaged with the notch of the third locking plate.

13. The recliner heart of claim 12, wherein a center point of the third locking plate is offset from a center point of the second locking plate.

14. A recliner heart comprising:
a first locking plate defining a plurality of first recesses;
a second locking plate;
a third locking plate disposed between the first and second locking plates and including a first inner diametrical surface and a second inner diametrical surface, the first inner diametrical surface having a plurality of notches formed therein; and
a plurality of first pawls slidably disposed in the first recesses and are movable within the first recesses between a secure position in which the first pawls are engaged with the notches of the third locking plate and a release position in which the first pawls are disengaged from the notches of the third locking plate,
wherein the first pawls include locking protrusions that selectively engage corresponding ones of the notches, and wherein a total number of locking protrusions of all of the first pawls is equal to a total number of notches formed in the third locking plate, and
wherein each of the first pawls includes only two locking protrusions.

15. The recliner heart of claim 14, wherein the third locking plate includes a partition disposed between the first and second inner diametrical surfaces, and wherein the partition extends radially inward, and wherein the partition extends radially inward and defines an opening having a diameter that is smaller than the diameters of the first and second inner diametrical surfaces.

16. The recliner heart of claim 14, further comprising a plurality of second pawls slidably disposed in a plurality of second recesses defined by the second locking plate and movable within the second recesses between a secure state in which the second pawls are engaged with teeth of the third locking plate and a release state in which the second pawls are disengaged from the teeth of the third locking plate, and wherein the third locking plate includes a radially inwardly extending partition that is disposed between the notches and the teeth and between the first pawls and the second pawls.

17. The recliner heart of claim 16, wherein the first locking plate is permitted to rotate without corresponding rotation of the second and third locking plates when the first pawls are disengaged from the notches of the third locking plate and the second pawls are engaged with the teeth of the third locking plate.

18. The recliner heart of claim 17, wherein the first and third locking plates are permitted to rotate without corresponding rotation of the second locking plate when the second pawls are disengaged from the teeth of the third locking plate and the first pawls are engaged with the notches of the third locking plate.

19. The recliner heart of claim 18, wherein the second locking plate includes a plurality of second protrusions, and wherein each of the second recesses is defined by adjacent ones of the second protrusions.

20. The recliner heart of claim 19, further comprising a cam engaging the second pawls and causing the second pawls to slide to the secure position.

21. The recliner heart of claim 20, further comprising a connector disk rotationally fixed to the cam, wherein the cam and the connector disk are disposed between the first and second locking plates, and wherein a spring engages the connector disk and biases the second pawls to the secure state.

22. The recliner heart of claim 14, wherein the first locking plate includes a plurality of first protrusions, and wherein each of the first recesses is defined by adjacent ones of the first protrusions.

23. The recliner heart of claim 22, further comprising a cam engaging the first pawls and causing the first pawls to slide to the secure position, wherein the cam extends through the first locking plate, and wherein a spring engages the cam and biases the first pawls to the secure position.

* * * * *